(12) United States Patent
Sibert et al.

(10) Patent No.: US 10,936,719 B2
(45) Date of Patent: Mar. 2, 2021

(54) PRESERVING TRUST DATA DURING OPERATING SYSTEM UPDATES OF A SECURE ELEMENT OF AN ELECTRONIC DEVICE

(71) Applicant: Apple Inc., Cupertino, CA (US)

(72) Inventors: Hervé Sibert, Paris (FR); Matthias Lerch, San Francisco, CA (US); Oren M. Elrad, San Francisco, CA (US); Peng Liu, San Jose, CA (US); Rahul Narayan Singh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 15/712,097

(22) Filed: Sep. 21, 2017

(65) Prior Publication Data

US 2018/0089434 A1 Mar. 29, 2018

Related U.S. Application Data

(60) Provisional application No. 62/398,821, filed on Sep. 23, 2016.

(51) Int. Cl.
| | |
|---|---|
| *G06F 9/44* | (2018.01) |
| *G06F 21/57* | (2013.01) |
| *H04L 29/06* | (2006.01) |
| *H04W 12/08* | (2021.01) |

(52) U.S. Cl.
CPC .......... *G06F 21/57* (2013.01); *H04L 63/0853* (2013.01); *H04L 63/107* (2013.01); *H04W 12/0804* (2019.01); *H04W 12/0806* (2019.01)

(58) Field of Classification Search
None
See application file for complete search history.

(56) References Cited

U.S. PATENT DOCUMENTS

| | | | | |
|---|---|---|---|---|
| 8,752,039 | B1 * | 6/2014 | Bapat | G06F 8/65 |
| | | | | 717/171 |
| 2005/0289533 | A1 * | 12/2005 | Wang | G06F 11/1417 |
| | | | | 717/168 |
| 2006/0075284 | A1 * | 4/2006 | Skan | G06F 8/63 |
| | | | | 714/5.1 |
| 2006/0129520 | A1 * | 6/2006 | Lang | G06F 8/65 |
| 2006/0155773 | A1 * | 7/2006 | Drouet | G06F 9/4451 |
| 2008/0244248 | A1 * | 10/2008 | Childs | G06F 9/441 |
| | | | | 713/1 |

(Continued)

*Primary Examiner* — Insun Kang
(74) *Attorney, Agent, or Firm* — Morgan, Lewis & Bockius LLP

(57) ABSTRACT

Systems, methods, and computer-readable media for preserving trust data during operating system updates of a secure element of an electronic device are provide. An update package is received to update an existing secure element operating system to a new secure element operating system by exporting trust data from the existing secure element operating system, after the exporting, uninstalling the existing secure element operating system, migrating the exported trust data using a migration operating system when a data format version of the existing secure element operating system is different than a data format version of the new secure element operating system, installing the new secure element operating system, and importing the migrated trust data into the installed new secure element operating system.

20 Claims, 10 Drawing Sheets

(56) References Cited

U.S. PATENT DOCUMENTS

| | | | |
|---|---|---|---|
| 2010/0180281 A1* | 7/2010 | Chandra | G06F 9/4451 719/319 |
| 2011/0145807 A1* | 6/2011 | Molinie | G06F 8/65 717/170 |
| 2011/0154313 A1* | 6/2011 | Nolterieke | G06F 8/658 717/170 |
| 2013/0232491 A1* | 9/2013 | Radhakrishnan | G06F 9/5077 718/1 |
| 2015/0121357 A1* | 4/2015 | Ha | G06F 8/65 717/168 |
| 2015/0193221 A1* | 7/2015 | Khan | G06F 8/65 713/176 |
| 2015/0193224 A1* | 7/2015 | Ziat | G06F 8/65 717/172 |
| 2015/0319222 A1* | 11/2015 | Zamir | G06F 9/4856 709/217 |
| 2016/0054989 A1* | 2/2016 | Diebolt | G06F 8/61 717/177 |
| 2016/0092203 A1* | 3/2016 | Filali-Adib | G06F 9/4856 717/171 |
| 2016/0306617 A1* | 10/2016 | Riedisser | G06F 8/65 |
| 2017/0132418 A1* | 5/2017 | Alexeev | G06F 8/65 |
| 2017/0230237 A1* | 8/2017 | Maruyama | G06F 8/65 |
| 2017/0289115 A1* | 10/2017 | Lessiak | G06F 8/65 |
| 2018/0082065 A1* | 3/2018 | Liu | G06F 21/572 |
| 2018/0357059 A1* | 12/2018 | Franchi | G06F 8/65 |

\* cited by examiner

US 10,936,719 B2

PRESERVING TRUST DATA DURING OPERATING SYSTEM UPDATES OF A SECURE ELEMENT OF AN ELECTRONIC DEVICE

CROSS-REFERENCE TO RELATED APPLICATION(S)

This application claims the benefit of prior filed U.S. Provisional Patent Application No. 62/398,821, filed Sep. 23, 2016, which is hereby incorporated by reference herein in its entirety.

TECHNICAL FIELD

This disclosure relates to preserving trust data of a secure element of an electronic device, including to preserving trust data during operating system updates of a secure element of an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential, with the other entity in a contactless proximity-based communication. Such credentials are often provided on a secure element of the electronic device that is not accessible by normal functionalities of the electronic device, including debugging mechanisms.

SUMMARY OF THE DISCLOSURE

This document describes systems, methods, and computer-readable media for preserving trust data during operating system updates of a secure element of an electronic device.

For example, a method is provided for preserving data during an operating system update on an electronic device that includes a communications component and a secure element, wherein the secure element includes an existing secure element operating system with trust data. The method includes receiving, with the communications component, an update package including a new secure element operating system and a migration operating system. The method also includes processing, with the secure element, the received update package to update the existing secure element operating system to the new secure element operating system by exporting the trust data from the existing secure element operating system, after the exporting, uninstalling the existing secure element operating system, migrating the exported trust data using the migration operating system when a data format version of the existing secure element operating system is different than a data format version of the new secure element operating system, installing the new secure element operating system, and importing the migrated trust data into the installed new secure element operating system.

As another example, an electronic device is provided that includes a communications component operative to receive an update package including a new operating system and a migration operating system, and a secure element including an existing operating system and existing trust data that is associated with the existing operating system, wherein the secure element is configured to update the existing operating system to the new operating system of the update package by transforming the existing trust data into new trust data using at least one data transformation rule of the migration operating system and importing the new trust data into the new operating system.

As yet another example, a product is provided that includes a non-transitory computer-readable medium and computer-readable instructions, stored on the computer-readable medium, that, when executed, are effective to cause a computer to generate target trust data from source trust data of a source operating system according to rules of a migration operating system and import the target trust data into a target operating system.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION OF THE DISCLOSURE

Certain trust data from a current (or source or existing) secure element operating system ("SE OS") of an electronic device may be preserved when the source SE OS is updated to a new (or target) SE OS. Each SE OS may be associated with a data format version such that, when the source and target SE OSs have different data format versions, the difference may be identified by the secure element of the device (e.g., a bootloader of the secure element) and a migration operating system ("MOS") associated with the target SE OS may then be utilized to migrate the trust data from the source SE OS to a format that may be imported into the target SE OS. A portion of memory of the secure element of the device may be made available by replacing the source SE OS with the smaller MOS and then that memory portion may be used to temporarily hold a transformed copy of the trust data prior to replacing the original trust data with that transformed trust data in another portion of the memory, such that any interruption to the process may not result in any loss of any trust data.

Figure 1:
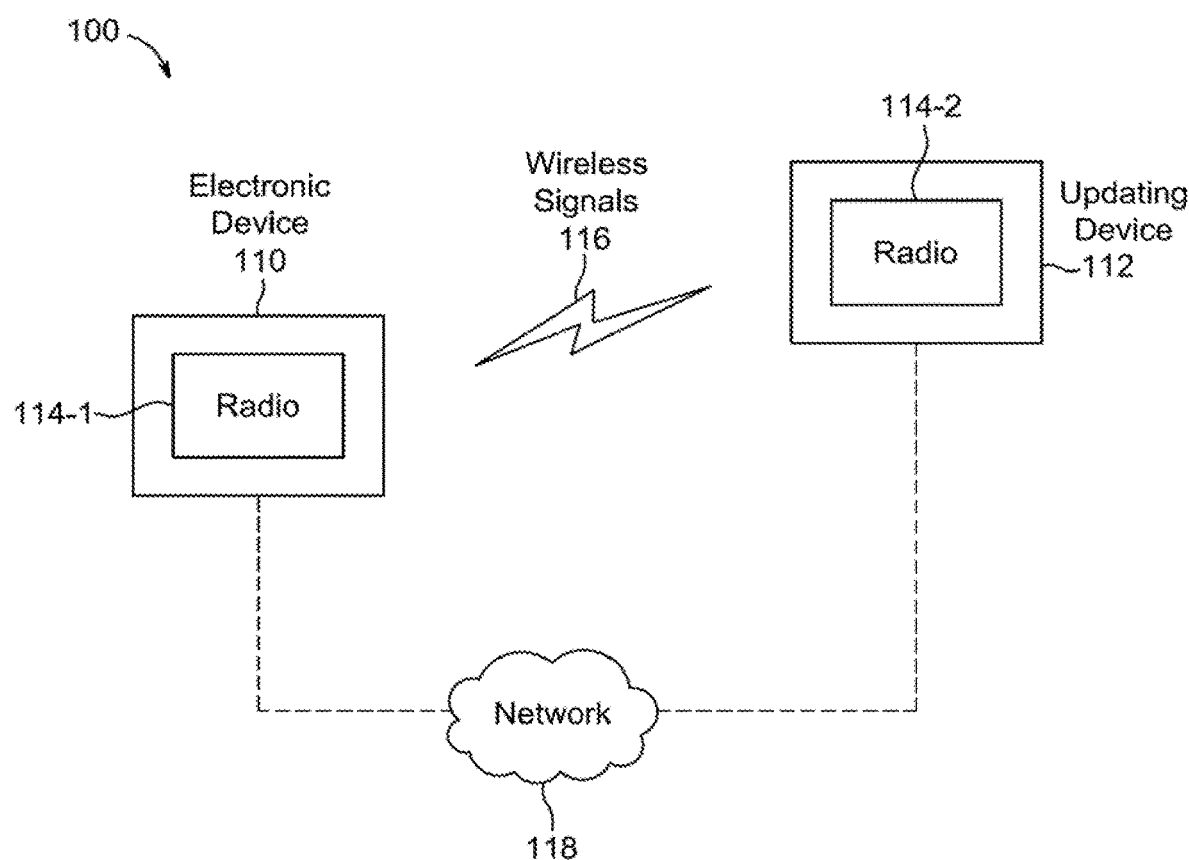
FIG. 1 is a schematic view of an illustrative system for preserving trust data during operating system updates of a secure element of an electronic device.

Description of FIG. 1

An electronic device (e.g., a cellular telephone, a laptop computer, wearable device, etc.) may automatically install and personalize updates to an applet and/or to an operating system ("OS") on a secure element ("SE") in the electronic device. In particular, when an update package (e.g., a digitally signed update package) containing such an update to a secure element applet and/or to a secure element operating system (e.g., as may be collectively referred to herein as a secure element asset) may be received from an updating device (e.g., a server), a version of an existing asset may be compared to the version of the asset of the update package and the comparison may be used to determine whether a migration asset of the package may be used to preserve certain trust data during the update process.

A secure element asset update package may be received via wireless communication between the electronic device and an updating device. Such a wireless communication may involve conveying packets that are transmitted and received by radios in the electronic device and the updating device in accordance with any suitable communication protocol, such as an Institute of Electrical and Electronics Engineers ("IEEE") 802.11 standard, Bluetooth™ (e.g., from the Bluetooth Special Interests Group of Kirkland, Wash.), and/or any other type of wireless interface, such as a near-field-communication ("NFC") standard or specification (e.g., from the NFC Forum of Wakefield, Mass.). In addition, the communication protocol may be compatible with a $3^{rd}$ generation of mobile telecommunications technology (e.g., a communication protocol that complies with the International Mobile Telecommunications-2000 specifications by the International Telecommunication Union of Geneva, Switzerland), a $4^{th}$ generation of mobile telecommunications technology (e.g., a communication protocol that may comply with the International Mobile Telecommunications Advanced specification by the International Telecommunication Union of Geneva, Switzerland), any other suitable generation of mobile telecommunications technology, and/or any other suitable cellular-telephone communication technique. In the discussion that follows, a cellular-telephone communication technique is used as an illustrative example. In some implementations, a secure element asset update package may, additionally or alternatively, be received via wired communication between the electronic device (or a proxy device) and an updating device.

The communication between the electronic device and the updating device may be shown by a system 100 of FIG. 1, which presents a block diagram illustrating an electronic device 110 in communication with an updating device 112. As described further below with reference to FIGS. 3-9, these electronic devices may communicate when updating device 112 (e.g., a server or an update computer) may provide an update package with an update to a previously loaded secure element asset (e.g., a new version of the secure element asset) that may be installed on electronic device 110 (e.g., a cellular telephone). For example, the previous version of the secure element asset may be installed on a secure element in electronic device 110. In addition, in some embodiments, a user of electronic device 110 may have previously customized or personalized the previous version with user data and/or device 110 may have previously automatically generated other trusted data for the previous version. For example, various types of SE OS trust data ("trust data") may be associated with a secure element operating system ("SE OS"), including, but not limited to, core OS trust data and user OS trust data. Core OS trust data ("core OS data") of an SE OS may be any suitable data relevant for the security of a system built around the SE, including, but not limited to, data that may facilitate pairing the SE to a secure enclave processor ("SEP"), data that may facilitate secure provisioning of applets on the SE, data that may facilitate secure provisioning of service provider ("SP") keys on the SE, data that may facilitate secure signing of any suitable SE information (e.g., serial number, platform identifier, etc.), and/or the like. Core OS data may be data that is essential for the viability of the SE OS. Core OS data may include any SE OS data that may be necessary to manage lifecycle data (e.g., credential lifecycle/production state data), secrets data (e.g., key mask data), applet data (e.g., package/applet/security domain registry data and/or security domain data (e.g., instances, native structures, key objects, certificates, applet migration data, etc.)), user trust data (e.g., personalization data), communication data (e.g., contactless parameters), and/or any other suitable data. Such core OS data may be stored in any suitable memory area of the secure element, such as a dedicated memory area. Certain portions or types of core OS data may be referred to herein as factory restore data, which may include essential data that, if lost/corrupted, would render the SE unusable (e.g., certain data written onto the SE OS of secure element 230 prior to or during provisioning of secure element 230 on device 110), where such data may be preserved in a reserved memory area of the SE that may be protected against overwriting, such that any updates to this type of data may be preserved in case such updates may be essential to enabling restoration of the SE to a usable state if other data is lost. User OS trust data ("user OS data") of an SE OS may be any suitable data relevant to a specific user of the SE, including, but not limited to, personalization data and keys, such as secure channel keys for SPs, SP certificates, and any other security relevant data, payment card data, and/or the like. Systems, methods, and computer-readable media are provided for preserving such SE OS trust data during an SE OS update (e.g., preserving all SE OS trust data when updating to a newer version of an SE OS and/or at least preserving certain if not all core OS trust data when updating to an older version of an SE OS and/or when rolling back to factory settings of the SE).

In at least some of the update techniques, the secure element may determine if the update package is relevant for electronic device 110 by identifying at least one, and, in some embodiments, all, previously installed versions or instances of the secure element asset. Then, the secure element may authenticate the update package by verifying a digital signature, which may be associated with a vendor of the secure element or a trusted partner of device 110. Alternatively, the digital signature may be associated with a provider of electronic device 110 or a secure element asset installed on a secure element in electronic device 110. For example, the secure element may use an encryption key associated with the vendor (e.g., a public encryption key) to verify the update package. Additionally or alternatively, the secure element may decrypt the update package using a second encryption key, which may be the same or different from the encryption key. In an exemplary embodiment, a public-private encryption-key technique may be used. In particular, an update package may be signed using a private encryption key of the vendor, and the digital signature may be verified and/or the update package may be decrypted using the public encryption key of the vendor. However, in other embodiments, a symmetric encryption technique may be used. Thus, the same encryption key may be used to sign, encrypt, and/or decrypt an update package. Then, the secure element may uninstall the at least one, and, in some embodiments, all, previous versions of the secure element asset and may export any trust data that may be associated with that secure element asset. Next, the secure element may install the update to the secure element asset, and may personalize the new version of the secure element asset using the trust data. In these ways, electronic device 110 and updating device 112 may be used to securely and flexibly disseminate and install updates to one or more secure element assets previously installed on electronic device 110.

The communication between electronic device 110 and/or updating device 112 may involve the exchange of packets that may include the update package. These packets may be included in frames in one or more wireless channels. As described further below with reference to FIG. 2, electronic device 110 and/or updating device 112 may include one or more subsystems, such as a networking subsystem, a memory subsystem, a processing subsystem, and/or a secure subsystem. In addition, as shown in FIG. 1, for example, electronic device 110 and/or updating device 112 may include radios 114 in a networking subsystem of that device (e.g., radio 114-1 of electronic device 110 and/or radio 114-2 of updating device 112). More generally, electronic device 110 and/or updating device 112 can include, or can be included within, any electronic devices with networking subsystems that may enable electronic device 110 and/or updating device 112 to wirelessly communicate with another electronic device. This can include transmitting frames on wireless channels that may enable electronic devices to make initial contact, followed by exchanging subsequent data/management frames (e.g., connect requests to establish a connection), configuring security options (e.g., internet protocol security ("IPSEC")), transmitting and receiving packets or frames, and the like.

As shown in FIG. 1, for example, wireless signals 116 (e.g., as represented by a jagged line) may be transmitted from/received by a radio 114-1 in electronic device 110. These wireless signals may be received by/transmitted from radio 114-2 in updating device 112. It is to be understood that the communication between electronic device 110 and/or updating device 112 may also occur via network 118, which may involve any wired or wireless communication, including with a different communication protocol than that of wireless signals 116. Moreover, the wireless communication may or may not involve a connection being established between electronic device 110 and/or updating device 112, and, therefore, may or may not involve communication via a wireless network (e.g., a cellular-telephone network).

Processing a packet or frame in electronic device 110 and/or updating device 112 may include receiving signals (e.g., wireless signals 116) with the packet or frame, decoding/extracting the packet or frame from received signals (e.g., wireless signals 116) to acquire the packet or frame, and/or processing the packet or frame to determine information that may be contained in the packet or frame (e.g., at least a portion of the update package). Communication among electronic device 110 and/or updating device 112 may be encrypted. Such encryption may use an encryption key (e.g., an encryption key that may be associated with a secure element asset and/or a vendor of the secure element). Additionally or alternatively, such encryption may use symmetric or asymmetric encryption techniques.

Although the environment shown in FIG. 1 is used as an example of system 100 herein, in alternative embodiments, different numbers or types of electronic devices may be present. For example, some system embodiments may include more or fewer electronic devices. As another example, in another embodiment, different electronic devices may be transmitting and/or receiving packets or frames.

Figure 2:
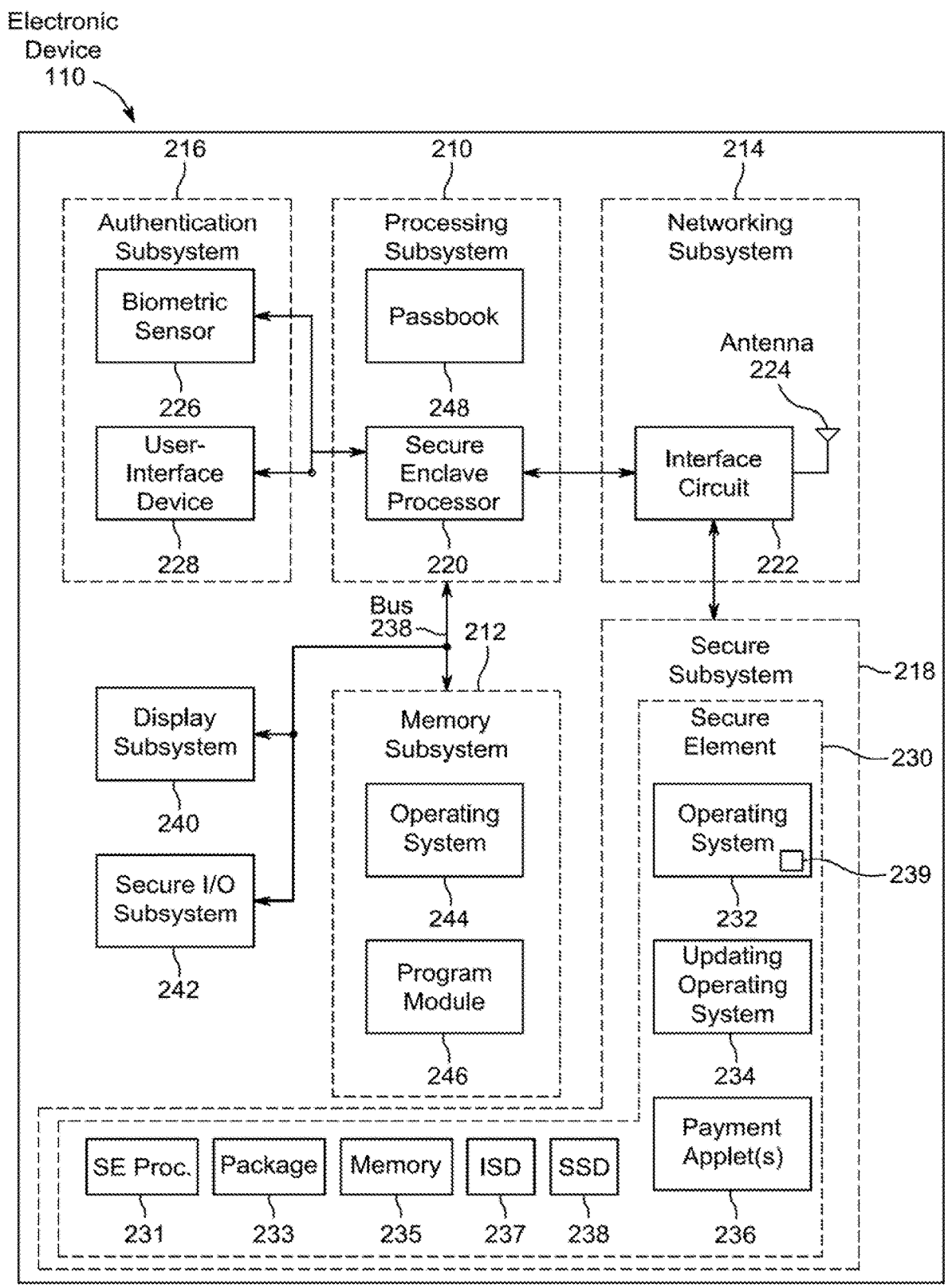
FIG. 2 is a more detailed schematic view of an example electronic device of the system of FIG. 1.
Figure 2A:
FIG. 2A is a diagram illustrating an exemplary secure element asset update package of the system of FIGS. 1 and 2.

Description of FIG. 2 and FIG. 2A

FIG. 2 presents a block diagram illustrating a more detailed view of example electronic device 110 of system 100 of FIG. 1. As shown, for example, electronic device 110 may include a processing subsystem 210, a memory subsystem 212, a networking subsystem 214, an authentication subsystem 216, and/or a secure subsystem 218. Processing subsystem 210 may include one or more devices that may be configured to perform one or more computational operations. For example, processing subsystem 210 may include one or more microprocessors, application-specific integrated circuits ("ASICs"), microcontrollers, programmable-logic devices, and/or one or more digital signal processors ("DSPs").

Additionally or alternatively, processing subsystem 210 may include a secure enclave processor ("SEP") 220 (e.g., a system-on-chip within one or more processors in processing subsystem 210) that may perform one or more security services for one or more other components in the processing subsystem 210 and/or that may securely communicate with other subsystems in electronic device 110. Secure enclave processor 220 may include one or more processors, a secure boot read-only memory ("ROM"), one or more security peripherals, and/or any other suitable components. The security peripherals may be hardware-configured to assist in the secure services that may be performed by secure enclave processor 220. For example, the security peripherals may include authentication hardware that may implement various authentication techniques, encryption hardware that may be configured to perform encryption, secure-interface controllers that may be configured to communicate over a secure interface to other components, and/or other suitable components. In some embodiments, instructions that may be executable by secure enclave processor 220 may be stored in a trust zone in memory subsystem 212 that may be assigned to secure enclave processor 220, and secure enclave processor 220 may fetch the instructions from the trust zone for execution. Secure enclave processor 220 may be isolated from the rest of processing subsystem 210 except for a carefully controlled interface, which may thereby form a secure enclave for secure enclave processor 220 and its components. As the interface to secure enclave processor 220 may be carefully controlled, direct access to components within secure enclave processor 220 (e.g., a processor or a secure boot ROM) may be prevented. In some embodiments, secure enclave processor 220 may encrypt and/or decrypt and/or otherwise reformat authentication information that may be communicated with authentication subsystem 216, and/or may encrypt and/or decrypt and/or otherwise reformat information (e.g., tokens) that may be communicated with secure subsystem 218. Furthermore, secure enclave processor 220 may compare authentication information with stored authentication and, if a match is obtained, may provide an encrypted token with an authentication-complete indicator to a secure element (e.g., a secure element 230 of secure subsystem 218) and/or may assert the authentication-complete indicator as a flag in an operating system (e.g., in an operating system 244 of memory subsystem 212).

Memory subsystem 212 may include one or more devices for storing data and/or instructions for processing subsystem 210, networking subsystem 214, authentication subsystem 216, and/or secure subsystem 218. For example, memory subsystem 212 can include dynamic random access memory ("DRAM"), static random access memory ("SRAM"), and/or any other suitable type of memory. In some embodiments, instructions for processing subsystem 210 in memory subsystem 212 may include one or more program modules or sets of instructions (e.g., program module 246, which may be a digital wallet, a passbook, and/or a mobile payments application), which may be executed by processing subsystem 210. It is to be understood that the one or more computer programs may constitute a computer-program mechanism or a program module. Moreover, instructions in the various modules in memory subsystem 212 may be implemented in a high-level procedural language, an object-oriented programming language, and/or in an assembly or machine language. Furthermore, the programming language may be compiled or interpreted (e.g., configurable or configured, which may be used interchangeably in this discussion) to be executed by processing subsystem 210.

Additionally or alternatively, memory subsystem 212 can include one or more mechanisms for controlling access to the memory. In some embodiments, memory subsystem 212 may include a memory hierarchy that may include one or more caches that may be coupled to a memory in electronic device 110. In some of these embodiments, one or more of the caches may be located in processing subsystem 210.

In some embodiments, memory subsystem 212 may be coupled to one or more high-capacity mass-storage devices (not shown). For example, memory subsystem 212 can be coupled to a magnetic or optical drive, a solid-state drive, or another type of mass-storage device. In such embodiments, memory subsystem 212 can be used by electronic device 110 as fast-access storage for often-used data, while the mass-storage device may be used to store less frequently used data.

Networking subsystem 214 may include one or more devices that may be configured to couple to and/or communicate on a wired and/or wireless network (e.g., to perform network operations), which may include an interface circuit 222 (e.g., a near-field-communication circuit) and/or an antenna 224. For example, networking subsystem 214 can include a Bluetooth™ networking system, a cellular networking system (e.g., a 5G/4G network, such as UMTS, LTE, etc.), a universal serial bus ("USB") networking system, a networking system based on one or more of the standards described in IEEE 802.11 (e.g., a Wi-Fi networking system), an Ethernet networking system, and/or any other suitable communication system (e.g., a near-field-communication system).

Networking subsystem 214 may include one or more processors, controllers, radios/antennas, sockets/plugs, and/or any other suitable devices that may be used for coupling to, communicating on, and/or handling data and/or events for each supported networking or communication system. It is to be understood that mechanisms that may be used for coupling to, communicating on, and/or handling data and/or events on the network for each network system may sometimes be collectively referred to as a "network interface" for the network system. Moreover, in some embodiments a "network" between electronic devices may not yet exist. Therefore, electronic device 110 may use one or more mechanisms in networking subsystem 214 for performing simple wireless communication between electronic device 110 and updating device 112 of FIG. 1 (e.g., for transmitting advertising frames and/or near-field communication).

Authentication subsystem 216 may include one or more processors, controllers, and/or other suitable devices for receiving authentication information from a user of electronic device 110, and/or for securely communicating authentication information to processing subsystem 210 (e.g., by encrypting the authentication information). For example, the authentication information may include a biometric identifier that may be acquired by a biometric sensor 226 (e.g., a fingerprint sensor, a retinal sensor, a palm sensor, a digital signature-identification sensor, etc.), a personal identification number ("PIN") that may be associated with one or more payment applets (e.g., one or more payment applets 236 of secure element 230 of secure subsystem 218) that may be received using a user-interface device 228 (e.g., a keypad, a touch-sensitive display, optical character recognition, and/or voice recognition), and/or a passcode for unlocking at least some functionality of electronic device 110 that may be received using user-interface device 228.

Furthermore, secure subsystem 218 may include a secure element 230, which may include one or more processors (e.g., SE processor 231) and/or memory (e.g., SE memory 235). Secure element 230 may be a tamper-resistant component that may be used in electronic device 110 to provide the security, confidentiality, and/or multiple application environments that may be required to support various business models. Secure element 230 may exist in one or more of a variety of form factors, such as a universal integrated circuit card ("UICC"), an embedded secure element (e.g., on a circuit board in electronic device 110), a smart secure digital ("SD") card, a smart microSD card, and the like.

Moreover, secure element 230 may include one or more applets or applications that may execute in an environment of secure element 230 (e.g., in a main operating system 232 of secure element 230, and/or in a Java runtime environment (e.g., an environment with a Java virtual machine implementation and/or an implementation of a Java class library) executing on secure element 230). For example, the one or more applets may include an authentication applet that may perform contactless registry services, encrypt/decrypt packets or tokens communicated with secure enclave processor 220, set one or more software flags (e.g., an authentication-complete flag) in operating system 232 of secure element 230, and/or convey information to one or more payment applets 236. The one or more applets may include one or more payment applets 236 that may conduct financial transactions with another electronic device when they are activated by program module 246, and/or based on one or more software flags, and/or when electronic device 110 may be proximate to another electronic device (e.g., such as in a range of 1-10 centimeters for an NFC communication). In particular, payment applets 236 may each be associated with a financial vehicle (e.g., a credit card, a debit card, a prepaid debit card, a stored value card, a gift card and, more generally, a financial vehicle that may be provided by a financial institution (e.g., a bank) that may be associated with a financial account of a user, such as a user of electronic device 110). In addition, secure element 230 may include information that may be associated with the one or more payment applets 236 (e.g., a financial credential (e.g., a device primary account number ("DPAN"), a PIN (e.g., for a debit-card number) that may be associated with a given payment applet, and/or one or more encryption keys that may be associated with a given payment applet) that may be used when conducting a financial transaction. It is to be understood that a DPAN may be associated with, but different than, a financial primary account number ("FPAN") for a financial account, such as a credit card number, where the DPAN may be a virtual identifier for the financial account. Any other suitable applets 236 or credentials that may not be considered payment applets may also be provisioned on secure element 230.

An authentication applet may execute in a master security domain or issuer security domain ("ISD") or controlling authority security domain ("CASD") or any other suitable known or high level security domain in secure element 230 (e.g., ISD 237), while payment applets 236 may execute in supplemental security domains ("SSD") in secure element 230 (e.g., SSD 238, which may include or be associated with one or more particular payment applets 236). Communication between these security domains may be encrypted using different encryption/decryption keys that may be security-domain specific. In electronic device 110 and/or during communication between electronic device 110 and/or updating device 112, encryption/decryption may involve symmetric and/or asymmetric encryption. Additionally or alternatively, the information communicated may include a digital signature that may be specific to electronic device 110 and/or components in electronic device 110, such as secure element 230 and/or one of payment applets 236, SSD 238, and/or ISD 237.

During operation of electronic device 110, the user may use passbook 248 to select or activate one or more of payment applets 236. If the payment applet supports an authentication-complete flag (e.g., as may be indicated by the enabling or setting of authentication support in the payment applet), in order for the payment applet to conduct a transaction (e.g., a financial or other suitable secure data transaction) with another electronic device, the payment applet may need to be activated and the authentication-complete flag may need to be set or enabled in secure element 230 (e.g., for indicating that the user has been authenticated). In contrast, for one of payment applets 236 that may not support the authentication-complete flag, a transaction may be conducted when this payment applet is active (e.g., operation of the payment applet may not be gated by the setting or enabling of the authentication-complete flag in secure element 230). While the present discussion illustrates the use of a global authentication-complete flag, it is to be understood that, in some embodiments, there may be separate authentication-complete flags associated with at least some of payment applets 236 (e.g., there may be a specific authentication-complete flag for a given payment applet, etc.).

When electronic device 110 may be proximate to the other electronic device (e.g., a point-of-sale ("POS") terminal) or when secure enclave processor 220 may provide a payment command to secure element 230, one of the specified, activated, and/or authenticated payment applets 236 may provide a payment packet, which may be encrypted or unencrypted, to interface circuit 222 or to secure enclave processor 220, which may then provide the payment packet to interface circuit 222. Then, interface circuit 222 may communicate the payment packet to the other electronic device (e.g., a POS terminal) using antenna 224. It is to be understood that the payment packet may include financial information (e.g., a financial credential or a DPAN that may be associated with the one of the payment applets 236).

Such financial information, as well as any additional information that may be provided by the other electronic device (e.g., a merchant identifier, an amount of the financial transaction, etc.), may be communicated by the other electronic device to a payment network (e.g., a payment network of network 118) to complete a financial transaction. Once the financial transaction is complete, a notification from a management electronic device, which may be associated with a provider of electronic device 110, may be received by interface circuit 222. Passbook 248 may provide the notification to display subsystem 240 for display, so the user of electronic device 110 can be alerted that the financial transaction was successfully completed.

As noted previously, during an update of a secure element asset (e.g., of a payment applet 236 and/or of an operating system 232 of secure element 230 of electronic device 110), electronic device 110 may receive a digitally signed update package from updating device 112. In particular, interface circuit 222 may receive the update package, and may provide the update package to processing subsystem 210 (e.g., secure enclave processor 220). Then, processing subsystem 210 (e.g., secure enclave processor 220) may securely communicate the update package to secure element 230, whereby, as shown, secure subsystem 218 may be operative to also (temporarily) include a secure element asset update package 233 that may be received by secure subsystem 218 from updating device 112 (e.g., via networking subsystem 214 and processing subsystem 210). In response, at least when update package 233 is for updating a secure element operating system type of secure element asset, main SE operating system 232 and/or an updating SE operating system 234 and/or a program module executed by a mini-controller or a secure element processor 231 in secure element 230 in an environment of SE operating system 232 and/or in an environment of updating SE operating system 234 may identify at least one previous version of an SE OS that may be installed on secure element 230 (e.g., SE OS 232 (e.g., as may be identified by any suitable SE OS version information 239 of SE OS 232, such as information indicative of an OS version of SE OS 232 and/or information indicative of a data format version of SE OS 232 (e.g., version information that may be defined by a creator of SE OS 232 prior to installation of SE OS 232 on device 110))). For example, the at least one previous version of main SE operating system 232 may be identified by searching a registry associated with updating SE operating system 234.

When update package 233 may be configured for updating an applet type secure element asset, main SE operating system 232 may verify a digital signature of such an update package 233 using an encryption key that may be associated with a vendor of secure element 230 or a vendor of the applet (e.g., a key associated with ISD 237 and/or SSD 238). In some embodiments, main SE operating system 232 may decrypt update package 233 using a second encryption key that may be associated with the vendor of secure element 230 or the vendor of the applet. This second encryption key may be the same as or different from the encryption key. Next, main SE operating system 232 may uninstall the at least one previous (e.g., currently existing) version of the applet, and may export any suitable user data that may be associated with the at least one previous version of the applet. Furthermore, main SE operating system 232 (or a newly installed version thereof if update package 233 includes an update for an applet type secure element asset and an update for an SE OS type secure element asset) may install the update to the applet (e.g., the new applet 236), and may personalize the applet using at least a portion of any of the user data that may have been exported. The uninstalling or deleting, exporting, installing, and/or personalizing of an applet may occur within a security domain on secure element 230 (e.g., within SSD 238 associated with that applet).

Alternatively or additionally, one or more of the aforementioned operations that may be performed by main SE operating system 232 may be performed by an updating SE operating system 234 (e.g., a high-end boot loader) that may be executed by the processor (e.g., SE processor 231 or any other suitable processor, which may be specifically associated with or uniquely used by updating SE operating system 234) in secure element 230. Updating SE operating system 234 may be separate from main SE operating system 232, which may perform other functions of secure element 230. Updating SE operating system 234 may update portions of main SE operating system 232 and/or software associated with one or more of applets 236. For example, when update package 233 may be configured for updating an operating system type secure element asset, updating SE operating system 234 may verify a digital signature of such an update package 233 using an encryption key that may be associated with a vendor of secure element 230 (e.g., a key associated with ISD 237) or the vendor of the secure element operating system. In some embodiments, updating SE operating system 234 may decrypt update package 233 using a second encryption key that may be associated with the vendor of secure element 230 or the vendor of the secure element operating system. This second encryption key may be the same as or different from the encryption key. Next, updating SE operating system 234 may uninstall the at least one previous (e.g., currently existing) version of main SE operating system 232, and may export any suitable OS trust data (e.g., core OS trust data and/or user OS trust data) that may be associated with the at least one previous version of the main SE operating system 232. Furthermore, updating SE operating system 234 may install the update to the main SE operating system (e.g., the new main SE operating system 232), and may personalize the main SE operating system using at least a portion of any of the OS trust data that may have been exported. The uninstalling or deleting, exporting, installing, and/or personalizing of the main SE operating system may occur within secure element 230. In some embodiments, updating SE operating system 234 may be configured to update both an applet and a main SE operating system concurrently (e.g., in response to a single update package 233 or two serially received update packages).

As shown in FIG. 2A, for example, when secure element asset update package 233 may be configured for at least updating an operating system type secure element asset, update package 233 may include any suitable data, including, but not limited to, one or more preflight migration scripts 233a that may be operative to export any OS trust data (e.g., obtain, serialize, and/or export any suitable OS trust data of SE OS 232 for preservation purposes during an SE OS update), a migration OS ("MOS") 233b that may be operative to transform any suitable data that ought to be preserved between the current SE OS and the new SE OS, a new SE OS 233c (e.g., a target SE OS that is to be used as an update in place of the existing source SE OS 232), and one or more postflight migration scripts 233e that may be operative to import any OS trust data (e.g., obtain, deserialize, and/or import/link any suitable OS trust data from SE OS 232 (e.g., as may have been processed by the one or more preflight migration scripts 233a and/or migration OS 233b) to new SE OS 233c for preservation purposes during an SE OS update). New SE OS 233c may include or otherwise be associated with a manifest 233d that may include any suitable data, such as an encoded structure with a signature and public key inserted with one or more fields in clear text but with a capability of encrypting certain fields, where the data fields may include tags that may contain measurement data attesting to one or more image(s) of new SE OS 233c. In some embodiments, manifest 233d may include any suitable SE OS version information 239n of new SE OS 233c, such as information indicative of an OS version of new SE OS 233c and/or information indicative of a data format version of new SE OS 233c (e.g., version information that may be defined by a creator of new SE OS 233c prior to communication of new SE OS 233c of package 233 to device 110).

SE memory 235 may be any suitable memory or combinations of different types of memories that may be operative to at least temporarily hold some or all data of secure subsystem 218, such as non-volatile memory ("NVM") or flash memory, permanent memory such as read-only memory ("ROM"), semi-permanent memory such as random access memory ("RAM"), any other suitable type of storage component, or any combination thereof.

Within electronic device 110, processing subsystem 210, memory subsystem 212, networking subsystem 214, authentication subsystem 216, and secure subsystem 218 may be coupled together using one or more interconnects, such as bus 238. These interconnects may include an electrical, optical, and/or electro-optical connection that the subsystems can use to communicate commands and data among one another. It is to be understood that different embodiments can include a different number or configuration of electrical, optical, and/or electro-optical connections among the subsystems. In some embodiments, electronic device 110 can detect tampering with secure components (e.g., secure enclave processor 220, secure element 230, and/or bus 238) and may destroy encryption/decryption keys or authentication information (e.g., a stored biometric identifier) if such tampering is detected.

In some embodiments, electronic device 110 may include display subsystem 240 for displaying information on a display (e.g., a notification of a successfully completed financial transaction or any suitable update or any other suitable user interface information), which may include a display driver and the display, such as a liquid-crystal display, a multi-touch touchscreen, and the like. In addition, in some embodiments, electronic device 110 may include a secure input/output ("I/O") subsystem 242 (e.g., a keypad) for receiving the PIN of a user that may be associated with one of payment applets 236. As noted previously, display subsystem 240 and/or secure I/O subsystem 242 may be included in authentication subsystem 216 or otherwise.

Electronic device 110 can be, or can be included in, any electronic device with at least one network interface. For example, electronic device 110 can be, or can be included in, a desktop computer, a laptop computer, a server, a media player (e.g., an MP3 player), an appliance, a subnotebook/ netbook, a laptop computer, a tablet computer, a smartphone, a cellular telephone, a piece of testing equipment, a network appliance, a set-top box, a personal digital assistant ("PDA"), a toy, a controller, a digital signal processor, a game console, a computational engine within an appliance, a consumer-electronic device, a portable computing device, a personal organizer, a wearable computing device, and/or any other suitable electronic device.

Although specific components may be used to describe electronic device 110, in alternative embodiments, different components and/or subsystems may be present in electronic device 110. For example, electronic device 110 may include one or more additional processing subsystems, memory subsystems, networking subsystems, authentication subsystems, secure subsystems, display subsystems, and/or secure I/O subsystems. Additionally, one or more of the subsystems may not be present in electronic device 110. Moreover, in some embodiments, electronic device 110 may include one or more additional subsystems that are not shown in FIG. 2. For example, electronic device 110 can include one or more of a data collection subsystem, an audio and/or video subsystem, an alarm subsystem, a media processing subsystem, and/or any other suitable subsystem. Also, although separate subsystems may be shown in FIG. 2, in some embodiments, some or all of a given subsystem or component can be integrated into one or more of the other subsystems or components in electronic device 110. For example, in some embodiments, program module 246 may be included in operating system 244. Alternatively or additionally, at least some of the functionality of program module 246 may be included in passbook 248.

Moreover, circuits and/or components in electronic device 110 may be implemented using any combination of analog and/or digital circuitry, including bipolar, P-type metal-oxide-semiconductor ("PMOS"), and/or N-type metal-oxide-semiconductor ("NMOS") gates or transistors. Furthermore, signals in these embodiments may include digital signals that may have approximately discrete values and/or analog signals that may have continuous values. Additionally, components and circuits may be single-ended or differential, and power supplies may be unipolar or bipolar.

One or more integrated circuits may implement some or all of the functionality of networking subsystem 214 (e.g., a radio) and, more generally, some or all of the functionality of electronic device 110. Moreover, the one or more integrated circuits may include hardware and/or software mechanisms that may be used for transmitting wireless signals from electronic device 110 to, and/or receiving signals at electronic device 110 from, updating device 112. Networking subsystem 214 and/or the one or more integrated circuits can include any number of radios. Note that the radios in multiple-radio embodiments may function in a similar way to the radios described in single-radio embodiments.

In some embodiments, networking subsystem 214 and/or the one or more integrated circuits may include a configuration mechanism (e.g., one or more hardware and/or software mechanisms) that may configure the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. It is to be understood that "monitoring" as used herein may include receiving signals from other electronic devices and possibly performing one or more processing operations on the received signals (e.g., determining if the received signal may include an advertising frame, etc.).

While a communication protocol compatible with a cellular-telephone network may be used as an illustrative example, the described embodiments of the SE update and techniques may be used in a variety of network or communication interfaces. Furthermore, while some of the operations of the disclosure may be implemented in hardware or software, in general the operations of the disclosure may be implemented in a wide variety of configurations and architectures. Therefore, some or all of the operations of the disclosure may be performed in hardware, in software, or in any combination of both.

While the preceding discussion may focus on the hardware, software, and functionality in electronic device 110, updating device 112 may have the same or similar hardware (e.g., processors, memory, networking interfaces, etc.) and/or software to support the operations that may be performed by these entities, as may be described further below with reference to FIGS. 3-9. In particular, these entities may include one or more computer systems with a processing subsystem that may execute one or more program modules that may be stored in a memory subsystem to perform the operations, and one or more networking interfaces that may communicate with other electronic devices, such as electronic device 110.

Description of FIGS. 3-9

Figure 3:
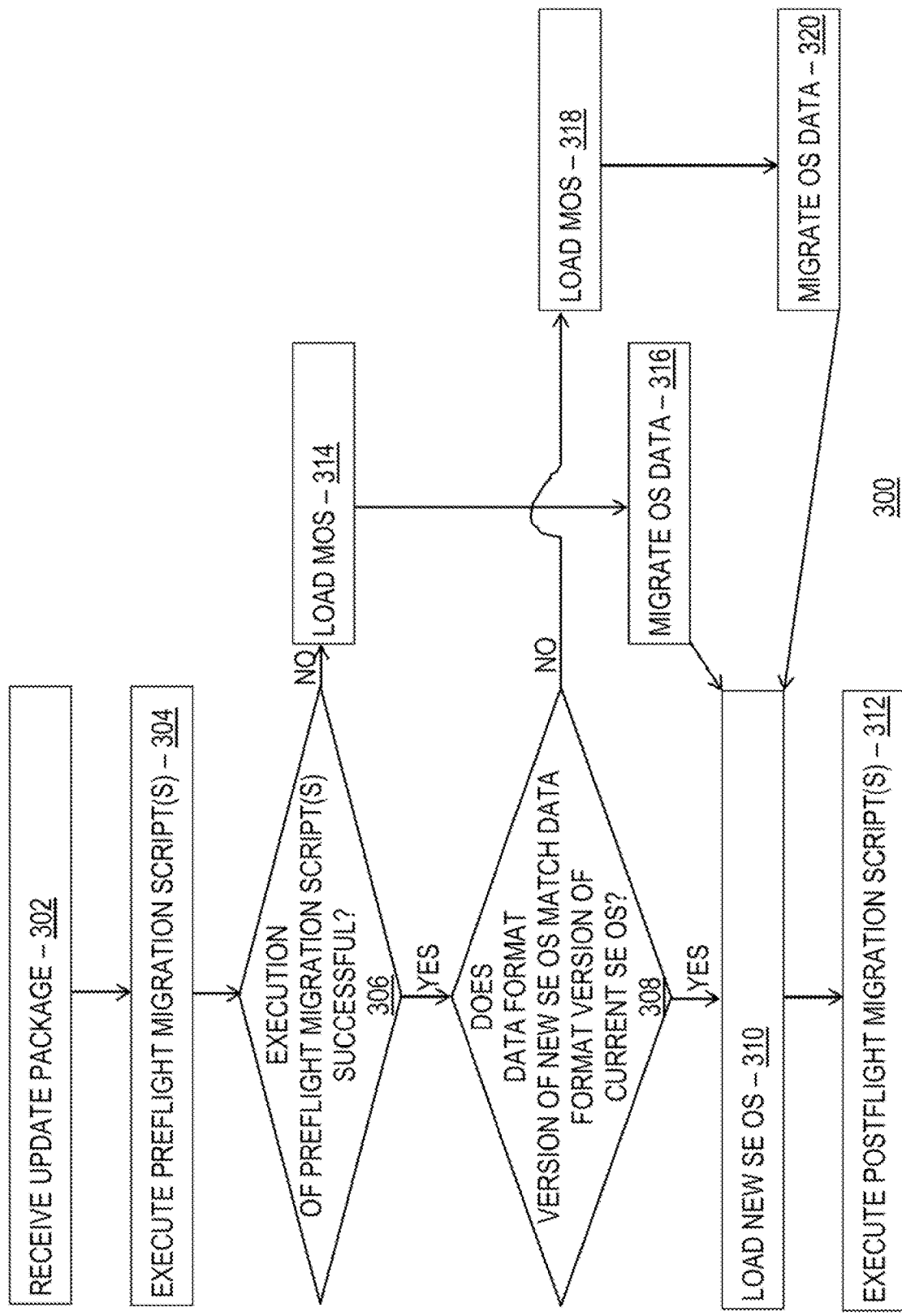
FIG. 3 is a flowchart of an illustrative process for preserving trust data during secure element operating system updates.
Figure 4:
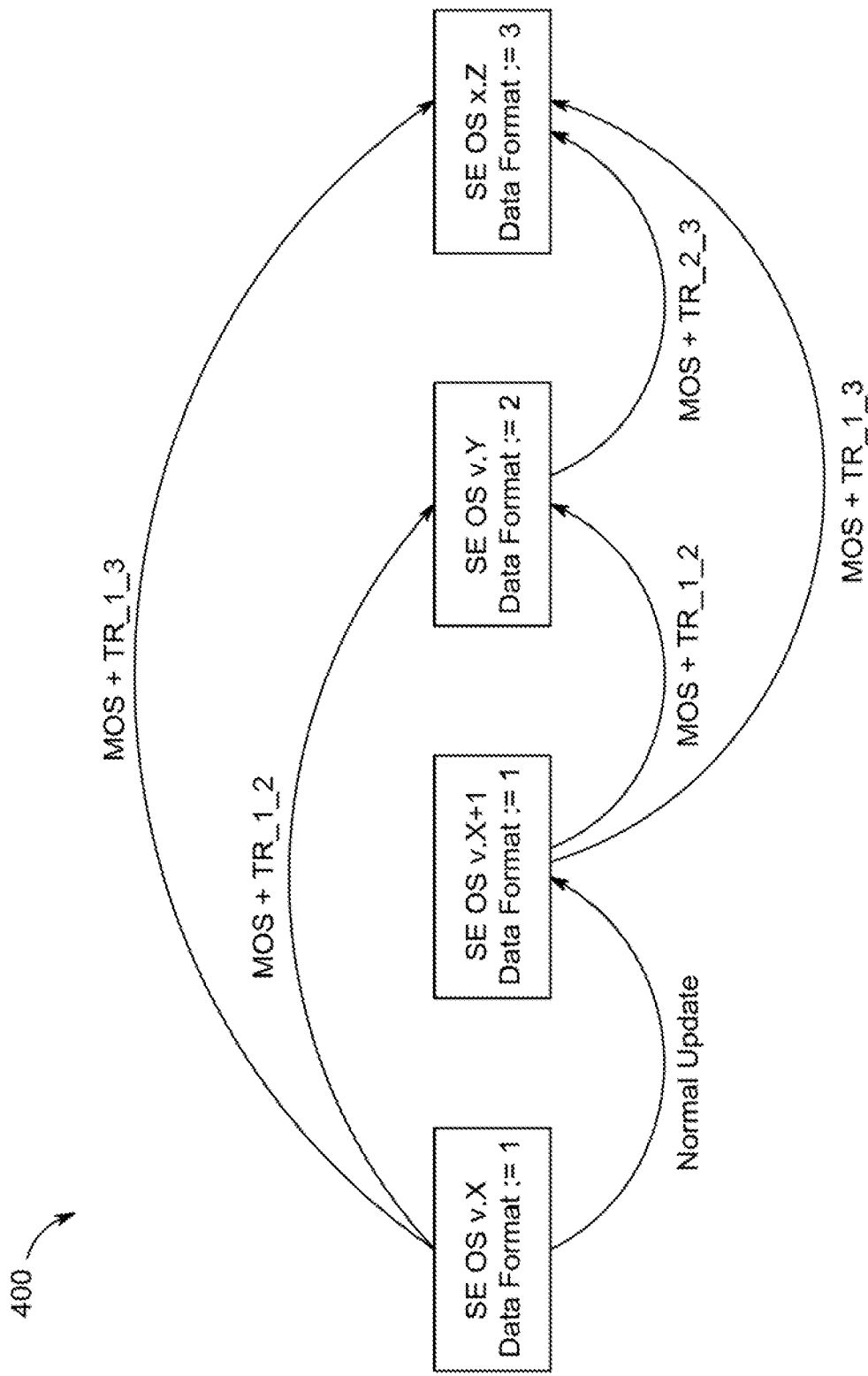
FIG. 4 is a diagram showing various example migration paths while updating a secure element operating system.
Figure 5:
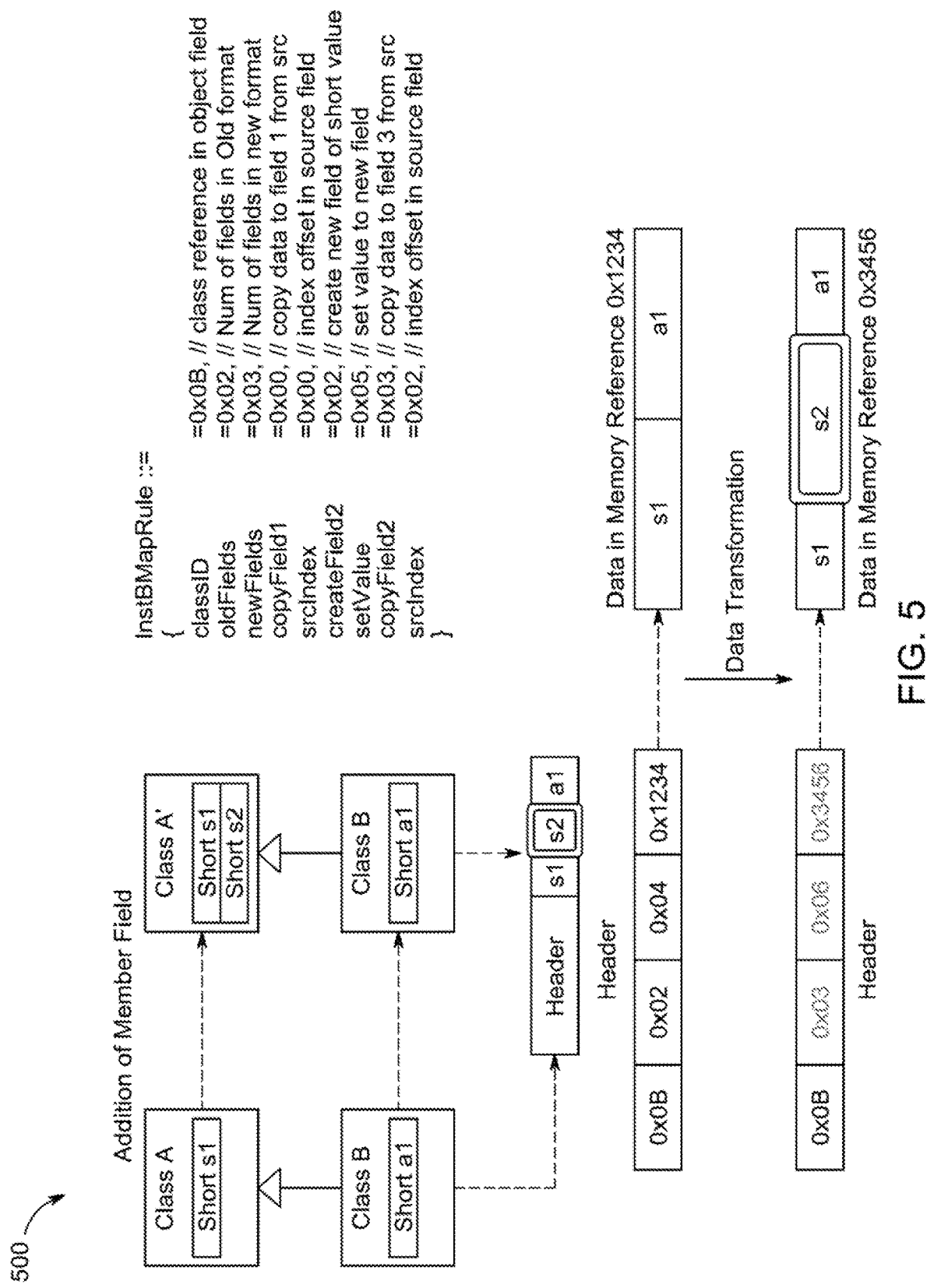
FIG. 5 is an illustration of a transformation rule transforming trust data during a secure element operating system update.
Figure 6:
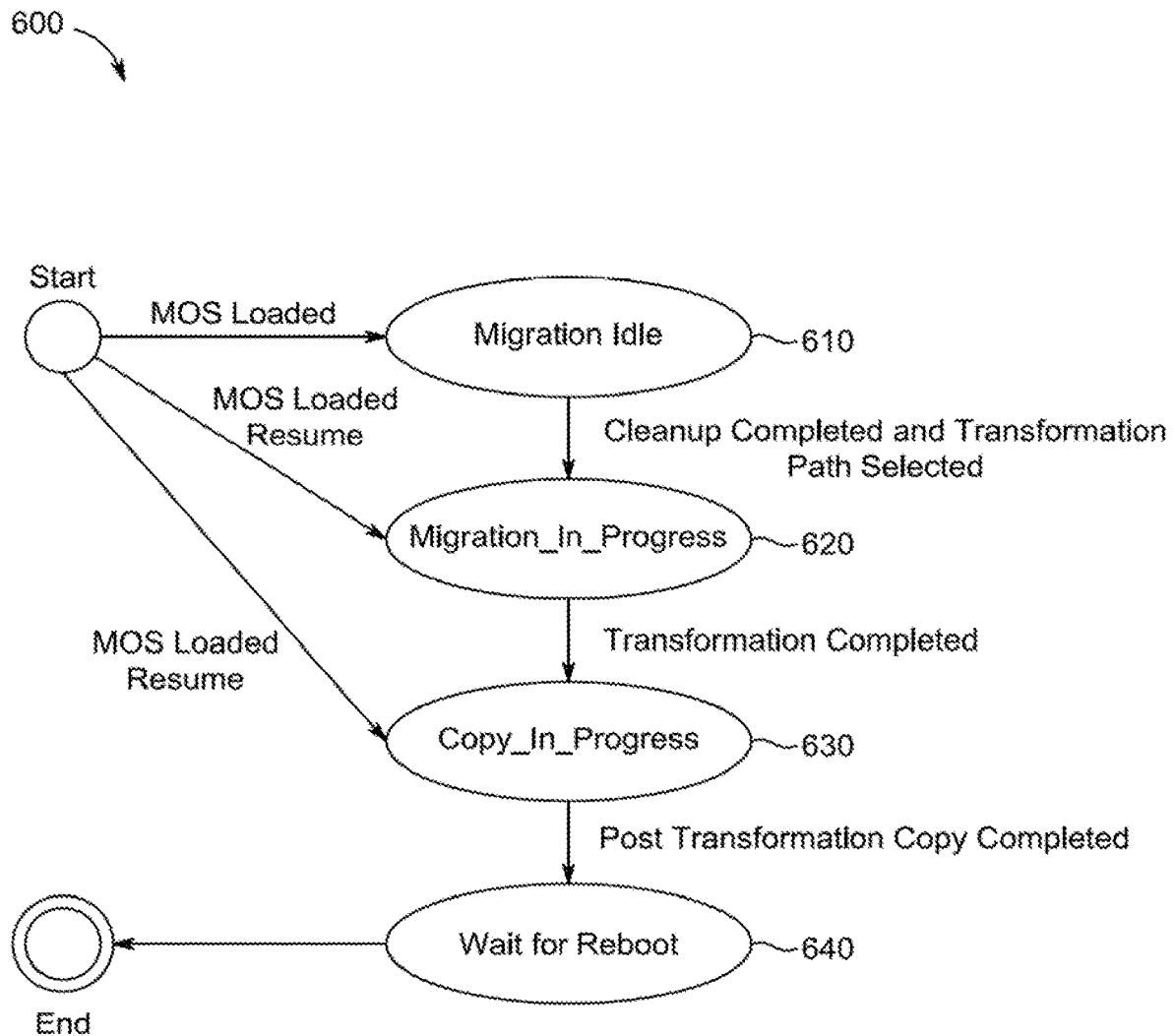
FIG. 6 is an illustrative state machine of a migration operating system for transforming trust data during a secure element operating system update.

FIG. 3 presents a flow diagram illustrating a process 300 for updating at least one asset (e.g., an applet and/or an operating system) installed on an electronic device (e.g., electronic device 110 in FIG. 1), which may be performed by a processor in a secure element in the electronic device (e.g., processor 231 of secure element 230). For example, the processor may execute a program module that may include instructions for operations in process 300. During operation 302, the processor may receive, from an updating device, an update package that may have a digital signature, where the update package may include an update to the asset installed on the secure element. For example, at operation 302, update package 233 may be received by secure element 230, where processor 231 (e.g., in conjunction with updating OS 234) may be operative to process received update package 233.

At operation 304, secure element 230 may be operative to execute one or more preflight migration scripts of the received update package. Continuing with the example of update package 233 being received at operation 302 for updating an SE OS on secure element 230 from current or source SE OS 232 to new or target SE OS 233c, processor 231 (e.g., in conjunction with updating OS 234) may be operative to execute at least one preflight migration script 233a of update package 233 at operation 304. Execution of one or more preflight scripts of an update package at operation 304 may include any suitable operations, including, but not limited to, verifying or otherwise decrypting any portion of the received update package (e.g., using any suitable decryption key), identifying at least one other version (e.g., previously loaded version) of a current/source secure element asset to be updated by the package (e.g., identify SE OS 232 in response to receiving package 233 with new SE OS 233c), exporting any trust data from each identified current secure element asset (e.g., obtaining, serializing, and/or exporting any suitable OS trust data of SE OS 232 for preservation purposes during an SE OS update), and uninstalling each identified current secure element asset (e.g., uninstalling SE OS 232).

At operation 306, it may be determined by secure element 230 whether the execution of the preflight script(s) of the update package at operation 304 was successful. If the execution of the preflight script(s) of the update package at operation 304 is determined at operation 306 to be successful, secure element 230 may determine whether a data format version of a new SE OS of the update package matches a data format version of a current SE OS at operation 308 (e.g., the current SE OS that may have been uninstalled at operation 304), such as by comparing any suitable data format version information of SE OS version information 239n of manifest 233d of new SE OS 233c with any suitable data format version information of SE OS version information of current SE OS 232. If the data format version of the new SE OS of the update package is determined to match the data format version of the current SE OS at operation 308, secure element 230 may load the new SE OS of the update package at operation 310 (e.g., new SE OS 233c of package 233 may be loaded into memory 235 for future use in place of previous SE OS 232 (e.g., SE OS 233c may replace SE OS 232 on secure element 230)). Then, after operation 310, secure element 230 may be operative to execute one or more postflight migration scripts of the received update package at operation 312, where, for example, processor 231 (e.g., in conjunction with updating OS 234) may be operative to execute at least one postflight migration script 233e of update package 233. Execution of one or more postflight scripts of an update package at operation 312 may include any suitable operations, including, but not limited to, importing any trust data from each current secure element asset identified at operation 304 (e.g., obtaining, deserializing, and/or importing/linking any suitable OS trust data (e.g., as may have been exported from source SE OS 232 by the execution of one or more preflight migration scripts 233a of package 233 at operation 304)) to new SE OS 233c as may have been loaded at operation 310. Operation 312 may also include secure element 230 performing any suitable consistency check to confirm that the new SE OS is fully functional and that no OS trust data has been lost. Therefore, following operations 302, 304, 306, 308, 310, and 312, all OS trust data from a source SE OS may be preserved and properly associated with a target SE OS during an SE OS updating process of process 300. Such a flow through process 300 (e.g., without any OS data migration of operation 316 and/or of operation 320 (e.g., without loading a distinct MOS binary)) may be possible for certain SE OS updates, such as simple SE OS updates under limited conditions, such as SE OS updates with source and target SE operating systems of the same data format version but of different SE OS versions, where the target SE OS may be operative to fix bugs (e.g., in native and/or JavaCard code) and/or to provide small code changes from the source SE OS (e.g., modify code in native functions and/or JavaCard methods), and where the newly loaded SE OS may be re-connected to the preserved OS trust data with limited or no modification, but where the SE OS update from source to target SE OS may not add or remove or otherwise modify any JavaCard application programming interfaces ("APIs"), classes, method signatures, fields, and/or the like (e.g., number and/or type of existing variables, static fields, instance fields, method signatures, etc.).

However, if the execution of one or more of the preflight script(s) of the update package at operation 304 is determined at operation 306 not to be successful, then secure element 230 may load migration OS 233b of package 233 at operation 314 and may then use loaded migration OS 233b to migrate certain OS data, such as any suitable or all OS trust data (e.g., as may have been exported from source SE OS 232 by the execution of one or more preflight migration scripts 233a of package 233 at operation 304), using any suitable type of data migration at operation 316, where such data migration may include any suitable data content migration (e.g., migration that may add, modify, and/or remove one or more fields and/or one or more objects (e.g., in the JavaCard code) of the appropriate OS data, etc.) and/or any suitable data structure migration (e.g., migration that may change any OS-internal representation of any memory elements (e.g., Java virtual machine heap elements) and/or that may otherwise modify any memory of the secure element (e.g., Java virtual machine heap) and/or that may modify stacks and/or memory area size of any memory of the secure element and/or that may add and/or remove core OS trust data, etc.). Depending on the nature of changes between the source SE OS and the target SE OS, different migration paths may need to be followed by migration OS 233b using different types of data migration, each of which may be provided by migration OS 233b of package 233. Then, after such migration of OS data at operation 316, process 300 may advance to operation 310, where secure element 230 may load the new SE OS of the update package (e.g., new SE OS 233c of package 233 may be loaded into memory 235 for future use in place of previous SE OS 232 (e.g., SE OS 233c may replace SE OS 232 on secure element 230)), after which, at operation 312, secure element 230 may be operative to execute one or more postflight migration scripts of the received update package, where, for example, processor 231 (e.g., in conjunction with updating OS 234) may be operative to execute at least one postflight migration script 233e of update package 233, which may include any suitable operations, including, but not limited to, obtaining, deserializing, and/or importing/linking any suitable OS trust data (e.g., as may have been exported from source SE OS 232 by the execution of one or more preflight migration scripts 233a of package 233 at operation 304 and/or as may have been migrated by migration OS 233b of package 233 at operation 316) to new SE OS 233c as may have been loaded at operation 310. Operation 312 may also include secure element 230 performing any suitable consistency check to confirm that the new SE OS is fully functional and that at least certain OS trust data has not been lost. Therefore, following operations 302, 304, 306, 314, 316, 310, and 312, all OS trust data from a source SE OS may be preserved and properly associated with a target SE OS during an SE OS updating process of process 300.

However, if the data format version of the new SE OS of the update package is determined not to match the data format version of the current SE OS at operation 308 (e.g., either is greater or less than the other), then secure element 230 may load migration OS 233b of package 233 at operation 318 and may then use loaded migration OS 233b to migrate certain OS data, such as any suitable or all OS trust data (e.g., as may have been exported from source SE OS 232 by the execution of one or more preflight migration scripts 233a of package 233 at operation 304), using any suitable type of data migration at operation 320, where such data migration may include any suitable data content migration (e.g., migration that may add, modify, and/or remove one or more fields and/or one or more objects (e.g., in the JavaCard code) of the appropriate OS data, etc.) and/or any suitable data structure migration (e.g., migration that may change any OS-internal representation of any memory elements (e.g., Java virtual machine heap elements) and/or that may otherwise modify any memory of the secure element (e.g., Java virtual machine heap) and/or that may modify stacks and/or memory area size of any memory of the secure element and/or that may add and/or remove core OS trust data, etc.). Depending on the nature of changes between the source SE OS and the target SE OS, different migration paths may need to be followed by migration OS 233b using different types of data migration, each of which may be provided by migration OS 233b of package 233. Then, after such migration of OS data at operation 320, process 300 may advance to operation 310, where secure element 230 may install or load the new SE OS of the update package (e.g., new SE OS 233c of package 233 may be loaded into memory 235 for future use in place of previous SE OS 232 (e.g., SE OS 233c may replace SE OS 232 on secure element 230)), after which, at operation 312, secure element 230 may be operative to execute one or more postflight migration scripts of the received update package, where, for example, processor 231 (e.g., in conjunction with updating OS 234) may be operative to execute at least one postflight migration script 233e of update package 233, which may include any suitable operations, including, but not limited to, obtaining, deserializing, and/or importing/linking any suitable OS trust data (e.g., as may have been exported from source SE OS 232 by the execution of one or more preflight migration scripts 233a of package 233 at operation 304 and/or as may have been migrated by migration OS 233b of package 233 at operation 320) to new SE OS 233c as may have been loaded at operation 310. Operation 312 may also include secure element 230 performing any suitable consistency check to confirm that the new SE OS is fully functional and that at least certain OS trust data has not been lost. Therefore, following operations 302, 304, 306, 308, 318, 320, 310, and 312, all OS trust data from a source SE OS may be preserved and properly associated with a target SE OS during an SE OS updating process of process 300.

It is understood that the operations shown in FIG. 3 are only illustrative and that existing operations may be modified or omitted, additional operations may be added, and the order of certain operations may be altered.

Note that one or more of the operations in method 300 may be performed by an updating SE operating system (e.g., updating SE operating system 234) that may be executed by the processor in the secure element (e.g., processor 231 of secure element 230), and the updating operating system may be separate from the normal operating system. Alternatively, one or more of the operations in method 300 may be performed by the normal operating system (e.g., main SE operating system 232) and/or by a program module executing in an environment associated with the normal operating system. The SE OS update with OS trust data preservation and/or OS trust data migration of process 300 may, in at least some implementations, rely solely on decisions made internally on secure element 230. No dependency of external triggers (e.g., triggers external to secure element 230), except the start of process of process 300 (e.g., receipt of update package 233), shall be required by process 300 in accordance with some embodiments. While updating SE operating system 234 of secure element 230 may be utilized as the primary control of process 300 (e.g., as a bootloader in conjunction with processor 231 and memory 235 of secure element 230), process 300 and other various aspects of this disclosure may describe interactions with a bootloader state machine of SE updating operating system 234 of secure element 230. Data exchange with such a bootloader may be handled in a secure way using, for example, a shared memory area (e.g., a shared NVM memory area of memory 235) that may have access control and checksum verification. For example, SE updating OS 234 (e.g., a bootloader of SE 230) may include a state machine that may be operative to control the complete SE OS update process. Data format versioning may be implemented to achieve certain design goals of data content migration ("DCM") process(es) and/or of data structure migration ("DSM") process(es). Each SE OS may be configured to be bound to a data format version and may save that data format version to SE memory (e.g., to NVM) such that SE updating OS 234 and any suitable bootloader programmer may be cooperative to read such saved data. One or more suitable rules may be used to dictate data format versioning, such as requiring that every SE OS version is to be bound to a particular data format version, each data format version is to be associated with a particular MOS, and/or each MOS may migrate SE OS data from any SE OS version older than the SE OS associated with that MOS to the data format version of the SE OS associated with that MOS. When the MOS completes its process, it may be configured to write its MOS version to a "Data Format Version" field in shared memory of SE memory 235 and may then be configured to trigger a reboot.

Process 300 shall be fail-safe in a way that it can always be restarted. For example, secure element 230 carrying out process 300 may be configured such that any failure in the SE OS update with OS trust data preservation and/or OS trust data migration of process 300 may not yield a loss of core OS trust data (e.g., at least the factory restore data of the core OS trust data) or, in some embodiments, of any OS trust data including user OS trust data. Instead, secure element 230 carrying out process 300 may be configured such that it may always be possible to restart or resume the process without any loss of such data. For example, it shall be possible to restart or resume an interrupted SE OS update process for updating to a first new target SE OS with a newer SE OS update process for updating to a second new target SE OS that is newer than the first new target SE OS. To achieve such performance, it may be important for process 300 to ensure that for each update path the SE OS is in a stable state before manipulating any data. Most users of most devices 110 may only be allowed by device 110 to update from an older SE OS to a newer SE OS (e.g., the OS version of target SE OS 233c identified by SE OS version information 239n of target SE OS 233c ought to be denoted by a greater version number than the OS version of SE OS 232 identified by SE OS version information 239 of SE OS 232), whereby all OS trust data may be preserved by process 300. However, certain users of certain device 110 may be allowed by device 110 to update from a newer SE OS to an older SE OS (e.g., the OS version of target SE OS 233c identified by SE OS version information 239n of target SE OS 233c may be denoted by a lesser version number than the OS version of SE OS 232 identified by SE OS version information of SE OS 232), whereby at least the core OS trust data may be preserved by process 300 if not also some or all of the user OS trust data, such as when data migration may not be required. However, when downgrading from a source SE OS to a target SE OS that does not have compatible data formats, the process may be split into a factory reset process and then an upgrade process from the factory reset SE OS to the requested target SE OS, whereby it may be acceptable to keep only factory essential data, with up-to-date values if these have been changed during the life of secure element 230. Process 300 may be operative to enable a factory reset, which may restore the initial factory settings of secure element 230 with the initial SE OS (e.g., as may have been initially defined and provisioned on secure element 230 by a manufacturer of secure element 230), whereby some or all user OS trust data may be lost and all of the core OS trust data other than the factory restore data of the core OS trust data may be lost, and whereby keys and/or counters of secure element 230 may be rolled back. Various portions of process 300 may be illustrated further below with reference to FIGS. 4-9.

As mentioned, when at least a portion of the OS trust data to be preserved ought to be migrated into a format readable by and adapted to the new target SE OS, then that OS trust data may be migrated by MOS 233b of package 233. Various migration strategies may be implemented by MOS 233b during process 300 for migrating OS trust data. Some strategies may be simpler and more robust but may require more memory resources, while other strategies may be more economic in terms of temporarily occupied memory but may be more complicated to render tearing safe. Generally, when MOS 233b is to be used, process 300 may include MOS 233b being downloaded (e.g., by updating OS 234 at operation 314 or operation 318) into an SE OS code area of a portion of SE memory 235, such as a portion of SE memory 235 previously loaded with source SE OS 232 (e.g., as shown with respect to FIG. 8). Then, loaded MOS 233b may be used (e.g., by updating OS 234 at operation 316 or operation 320) to migrate at least some or all OS trust data. Migration operations by loaded MOS 233b may include MOS 233b analyzing the data format version of source SE OS 232 based on the data format version of target SE OS 233c (e.g., by comparing any suitable data format version information of SE OS version information 239n of manifest 233d of new SE OS 233c with any suitable data format version information of SE OS version information 239 of current SE OS 232) to determine whether any suitable data structure migration ("DSM") operations may be necessary (e.g., migration that may change any OS-internal representation of any memory elements (e.g., Java virtual machine heap elements) and/or that may otherwise modify any memory of the secure element (e.g., Java virtual machine heap) and/or that may modify stacks and/or memory area size of any memory of the secure element and/or that may add and/or remove core OS trust data, etc.) and to carry out any operations determined to be necessary. Additionally or alternatively, migration operations by loaded MOS 233b may include MOS 233b analyzing any appropriate content transformation rules of MOS 233b based on version information 239 of source SE OS 232 and version information 239n of target SE OS 233c to determine whether any suitable data content migration ("DCM") operations may be necessary (e.g., migration that may add, modify, and/or remove one or more fields and/or one or more objects (e.g., in the JavaCard code) of the appropriate OS data, etc.) and to carry out any operations determined to be necessary.

Based on such DSM and DCM determination operations, DSM and/or DCM migration operations by loaded MOS 233b may be carried out that may include MOS 233b transforming certain ones or each object of core OS trust data and/or of user OS trust data. Each transformed object may be stored in a temporary SE OS code area of a portion of SE memory 235 (e.g., as shown with respect to FIG. 8). One or more handle/index table entries may then be modified to reflect the new address of each transformed object (e.g., the handle/index table may be copied to another portion of SE memory 235 and the addresses of the temporary objects may be added to that copied table, which may enable secure element 230 to keep track of original and modified objects at the same time). Up through such operations, the data migration operations by MOS 233b may be rolled back if necessary or appropriate or desired. One or various portions of SE memory 235 may be resized by secure element 230, and/or native variables and/or other suitable data may be added, modified, and/or deleted by secure element 230 if necessary or appropriate or desired. Then, each transformed object from the temporary SE OS code area portion of SE memory 235 may be copied back into the original object data portion of SE memory 235, such as in place of the object data that has since been transformed (e.g., as shown with respect to FIG. 8), during which a defragmentation operation may also be performed, and the modified handle/index table may be copied back over the original handle/index table (e.g., from the temporary SE OS code area portion of SE memory 235 back into the original table data portion of SE memory 235). Such OS data migration may be performed by MOS 233b in conjunction with updating OS 234 and processor 231 and memory 235 and/or any other suitable portions of secure element 230. Then, MOS 233b may be unloaded from SE memory 235 and new target SE OS 233c may be loaded into SE memory 235 (e.g., into an SE OS code area of a portion of SE memory 235, such as a portion of SE memory 235 previously loaded with source SE OS 232 and/or with MOS 233b (e.g., as shown with respect to FIG. 8), such as at operation 310 of process 300. Then, any postflight migration script(s) 233e of update package 233 may be executed to import the trusted OS data (e.g., as migrated or otherwise) to new target SE OS 233c, such as at operation 312 of process 300.

When determined to be appropriate, DCM operations by MOS 233b may include any suitable operations, including, but not limited to, creating new and/or modified fields and allowed objects, initializing primitive fields and new object references, re-writing values in correct format when a field type changes, preserving contents of instance fields of removed classes, and/or migrating core OS trust data and/or key masking area. While user OS trust data may be provided as part of a Java virtual machine heap memory portion of SE memory 235, core OS trust data and/or key masking area may not be provided as part of such a heap memory portion but may nevertheless be migrated as well. For heap objects and non-heap objects, the same transformation mechanisms may be applied, where the data format may be converted object by object and stored in a temporary memory area.

Various data transformation rules may be defined by update package 233 (e.g., by MOS 233b) to perform data migration from a source SE OS version to a target SE OS version, while MOS 233b may be operative to select the appropriate transformation rule(s) for data migration based on the data format version of the source SE OS and the data format version of the target SE OS. Each transformation rule may be operative to define the data mapping that maps a data object from the data format of the source SE OS to the data format of the target SE OS. Data object to data object mapping may be complicated by complex transformation and may require one-to-many and/or many-to-one transformation rules. As shown in diagram 400 of FIG. 4, various migration paths from various source SE operating systems to various target SE operating systems may be provided, where a particular dedicated transformation rule of package 233 may be used for each migration path. As just one example, the migration path marked with "MOS+TR_1_2" may indicate that the data migration from a source SE OS of OS version X and data format version 1 to a target SE OS of OS version Y and data format version 2 may use MOS 233b with a transformation rule ("TR") of "TR_1_2" (e.g., at operation 316 or operation 320 of process 300), while the migration path marked with "Normal Update" may indicate that the data migration from a source SE OS of OS version X and data format version 1 to a target SE OS of OS version X+1 and data format version 1 may not need to use MOS 233b as no data migration may be required during an SE OS update for a target SE OS with the same data format as the source SE OS (e.g., at operations 304, 306, 308, 310, and 312 without operations 314 and 316 and without operations 318 and 320 of process 300). Any suitable off-card tool (e.g., by any suitable mechanism(s) at updating device 112 or otherwise) may be used to analyze the differences between two SE OSs with different data formats and automatically generate the transformation rules.

Package 233 may include one or more dedicated transformation rules to perform different types of operations, including, for example, JavaCard CAP file linking, mapping of changes in static field(s) of Java source, mapping of members fields of Java instance, resizing transaction buffer, resizing heap, and/or the like. For example, as shown in illustration 500 of FIG. 5, an example of a transformation rule is depicted where an additional field may be added in the non leaf Java class. As shown, using a transformation rule for Class B, instances of Class A can be transformed, where, in a first operation, the instance entry heap may be transformed to a new format while preserving the reference Id of the instance in the heap. It may be necessary to preserve the reference Id of the Java instance. MOS 233b may modify the Java object header to change the number of field entries and length of a data part, while a data pointer in the header may be adjusted to point to a new data area. In a second operation, MOS 233b may copy data from the instance's old data area to the new data area and populate the additional added field with a default value. Any suitable tool may be provided for OS-update image preparation, where such a tool may be operative to analyze the differences between the JavaCard OS packages of the source SE OS and of the target SE OS to verify if the update may be possible by applying the above set of transformation rules. Such a tool may also be operative to verify the memory constraints to be able to estimate if there is enough memory (e.g., enough memory 235) to correctly perform the migration. From the difference analysis, the tool may be operative to build transformation tables and code (e.g., Id applicable code) that can be embedded into MOS 233b. There may be provided an opportunity to add manually written code (e.g., hand-written transformation code) for specific transformation(s) that cannot be managed automatically. DSM operations of MOS 233b may depend on the nature of the change between source SE OS data and target SE OS data, where a transformation strategy may be defined when the need for a particular migration is identified.

Data content migration operation(s) may be likely to occur in many SE OS updates. Such DCM operations may not provide a transformation of an object representation in a heap but may create new or modified objects. New objects may be created in a free space of the heap. Modified objects may be created, such as new objects, in free space and may then be referenced instead of the old objects. Deletion of objects may remove their references from the handle/index table and request a garbage collection. Such a garbage collection may physically remove all non-referenced objects (e.g., old objects from modification and deleted objects) from memory. For tight memory conditions, old objects may be deleted, then garbage collection and defragmentation may be performed, then objects may be modified, then memory may be cleaned up again, and then new objects may be created. Specific care may be directed towards tearing safety such that an interrupted data content migration process may be seamlessly resumed, even when a newer MOS has been loaded during the interruption.

Data structure migration operation(s) may be less likely to occur in SE OS updates. Such DSM operations may provide a transformation of an existing heap into a temporarily freed memory space of SE memory 235 (e.g., as freed by the unloading of the source SE OS and loading of an MOS that may be smaller than the source SE OS (and the to be loaded target SE OS)). The heap or other memory areas may be resized to accommodate more data or to free some memory for other areas that may grow.

When data migration is carried out due to changes in the internal object representation and/or to preserve data that may need to be moved around in memory, various different strategies may be considered, such as data serialization and direct migration. A data serialization strategy may be operative to convert the data into a version-independent and/or object-representation-independent format by serializing the content of the objects into a dedicated memory area using an export( )method, which may be is similar to applet data migration. The new SE OS may then be operative to use an import( )method to read the data and build the objects in their new internal format in the cleaned-up heap. A direct migration strategy may be operative to convert heap objects directly into their new format and store them in an intermediate memory area (e.g., a freed up memory portion). When the conversion process is finished, the old heap may be deleted and the intermediate heap may be copied into the original heap area. During such a process, the object handle/look-up table addresses may be modified twice, such as when creating the new objects and then when the object is copied in to new heap space. For native data, the data may be directly copied into their new location in their resized memory area. Depending on the new memory area layout, different copy strategies might be applied (e.g., from the beginning or from the end) to avoid double copying of such data. New data may be added at the end during such a process. Data structures and their content that may not be needed in the target SE OS nonetheless may be preserved. A goal of such transformation may be to set up the same memory image as if the target SE OS had been booted with all the trusted OS data (e.g., all the user trusted OS data) in place. The direct migration strategy may be efficient when an intermediate format of the data serialization strategy creates additional work and risk. It may be an effective solution when many data structure changes are expected as it may not be necessary to keep a library of MOSs to be able to migrate all older versions with different data representations to the latest one.

As shown by process 300 of FIG. 3, MOS 233b may be utilized as an intermediate OS in an SE OS update process to prevent any trusted OS data loss, such as any user OS trusted data loss. MOS 223b may be operative to transform OS data of the source SE OS such that the transformed OS data may be compatible with the target SE OS. MOS 233b may be configured to be fully failsafe even across versions. For example, an MOS of an update package including a target SE OS version Y may be configured to be able to resume a data migration that may have been initiated by an MOS of an update package including a target SE OS version X that may be lower (e.g., earlier) than or the same as version Y. As each MOS may be designed to solely perform data migration (e.g., data migration of OS data for compatibility with a target SE OS associated with the MOS (e.g., as may be provided in the same update package)), an MOS may be substantially smaller than the target SE OS, such that a substantial memory portion of SE memory 235 may be temporarily freed up when the MOS is loaded after the source SE OS has been unloaded but before the target SE OS has been loaded (e.g., as shown with respect to FIG. 8), and such that the temporarily freed up memory portion may be used for the data migration operations, where the size of the temporarily freed up memory may be the difference in size between the source SE OS and the MOS associated with the target SE OS. Every new available target SE OS may yield a new MOS, which may be operative to migrate any earlier source SE OS to the new target SE OS. In order to avoid the need for pre- and/or post-MOS operations related to OS update, the MOS may be self-contained (e.g., the MOS may be configured to identify its target SE OS version to which it may migrate the OS data, and/or the MOS may be configured to determine the source SE OS version), where such a self-contained MOS may be configured to carry out any suitable "cleanup routine(s)" that may be operative to finalize any suitable restore process(es) and/or defragmentation before migrating the data when a tear had occurred in the source SE OS and the migration had started after such a tear.

MOS 233*b* may be operative to maintain a state machine (e.g., in a particular SE memory portion (e.g., in an EEPROM or NVM memory portion in a data area of SE memory 235 (e.g., as shown with respect to FIG. 8)) or in secured memory of updating OS 234). As shown by an illustrative state machine 600 of FIG. 6, when MOS 233*b* may be triggered in a Migration Idle state 610, it may be operative to perform any or all pre-transformation operations (e.g., clean-up operation(s) (e.g., finalization of interrupted transaction commit operation(s) and/or rollback operation(s) and/or interrupted defragmentation operation(s)), a transformation rule selection operation, and/or the like) and then switch to a Migration_In_Progress state 620. When in Migration_In_Progress state 620, MOS 233*b* may be operative to perform all OS data transformation operations. During such an OS data transformation phase, MOS 233*b* may be operative to use memory space freed by the unloaded source SE OS to temporarily store the transformed data while keeping the current/source OS data untouched (e.g., as shown with respect to FIG. 8), such that, in case of tearing, MOS 233*b* (or another MOS of a later received update package post tearing) may be operative to check the migration state when migration is to be restarted, such that it may ignore any incomplete transformation and restart the transformation process if the current state is Migration_In_Progress 620. Once transformation is completed, MOS 233*b* may switch to a Copy_In_Progress state 630, at which MOS 233*b* may copy the transformed data from the temporary location to a memory area designated for the OS data for the target SE OS, after which the post transformation copying may be completed and the MOS may switch to a Wait For Reboot state 640. In case of tearing, MOS 233*b* (or another MOS of a later received update package post tearing) may be operative to start over, first complete the incomplete copy and then either redo the transformation (e.g., if the version of the MOS was changed in-between) or reset for OS download.

The capability for secure element 230 to downgrade its SE OS may be subject to low-level authorization by a platform, where rolling back security updates may be always forbidden or at least subject to specific authorizations. Typically, downgrade through major versions may not be allowed by default by updating OS 234. However, downgrade capabilities may be configured to be compatible with any suitable goals, such as short-term goals to enable downgrade through minor OS versions (e.g., as updating OS 234 may be operative to block downgrade through major versions) and/or long-term goals to enable any downgrade path (e.g., updating OS 234 may be operative to block downgrade if proper secure authorization of the downgrade is not provided (e.g., by a user of device 110 and/or by updating device 112)). Independent from any security considerations, downgrading the SE OS to an earlier version may increase the complexity of the MOS in charge of the downgrade, for example, if it is to be able to convert back the data format to any previous data format. In some embodiments, to simplify the design, it may not be mandatory to keep all user OS trust data when downgrading the SE OS, which may enable a simplified implementation with at least two major cases, including when the source SE OS and the target SE OS have the same data format version then the downgrade may be operative to preserve all the OS trust data, yet when the source SE OS and the target SE OS have different data format versions then the downgrade may be operative to preserve only essential OS trust data (e.g., a portion of core OS trust data that may be defined by factory provisioning and may potentially keep track of essential transformations undergone by such data during the lifetime of secure element 230). When the SE OS may change data format without changing major version, the support of downgrade of minor SE OS versions may not preclude supporting restoration of factory data. SE OS downgrade, especially restoration of factor data, may not be triggered by a malicious SE OS without proper authorization (e.g., there may not be allowed any mechanisms allowing the host to trigger such a procedure without security validation by secure element 230).

A restoration of factory data ("RFD") process may include restoring the memory layout, essential native data contents, and/or the JavaCard heap to the needed data format version. This may be performed by the MOS, which may be a dedicated factory MOS ("FMOS") that may be operative to just restore factory data as they are saved in order to roll back to the factory SE OS version (e.g., as long as such a roll back is authorized), or which may be a regular MOS that may be used to migrate data from one SE OS version to another with change of format. In embodiments using an FMOS, the original factory SE OS version or any updated SE OS version that did not require data migration can be loaded onto the SE. Any suitable metadata describing the memory layout of the factory SE OS data may be immutably stored in the SE and may be configured not to be affected by any SE OS update. However, tracking of updates performed to such factory SE OS data may be necessary to enable a secure restore, as when, for instance, after factory keys have been rotated, restoring the original keys may yield security issues and/or make the device unusable if the original keys have been revoked in the infrastructure. Other security critical data, such as the attack counter, may not be reinitialized by RFD. Keeping track of the evolution of some of the initial factory data may be done by having an immutable original reference copy and an updated rewritable copy stored in the SE.

When factory SE OS data may be immutably stored in the SE (e.g., in a secure data area of SE memory 235) and may be configured not to be affected by any SE OS update, the MOS that corresponds to a target SE OS may directly consider the data from the secure data area to be the source data, and may migrate such data to the required target version. RFD flow may be split into at least two parts, including, for example, an RFD entitlement flag flow that may be used by the platform to understand whether it is entitled to perform RFD, and an RFD process flow that may be used by the platform to process effectively a request to restore factory data. An RFD entitlement flag may be a flag stored in SE memory 235 (e.g., in flash memory) and managed by the SE OS and/or by the MOS. The RFD entitlement flag may have any suitable values, such as, for example, a 0x00000000 value when no RFD is allowed, a 0xF0F0F0F0 value when one RFD is allowed, and a 0xFFFFFFFF value when unlimited RFD is allowed. The RFD flag may be set by default by the SE chip vendor, such as to a value that may allow unlimited RFD (e.g., a 0xFFFFFFFF value). Whenever the RFD flag is set in flash, the Migration OS is entitled to restore factory data. This means that if there is a request from the host to the Migration OS to restore factory data, the Migration OS will perform this if, and only if, the RFD entitlement flag is set. When an RFD process starts, the RFD flag may be marked for deletion (e.g., if it has a 0xF0F0F0F0 value). Once it is marked for deletion, RFD may still be restarted as many times as necessary. The RFD flag may be erased either by the SE OS through an unauthenticated command (e.g., if the flag has a 0xFFFFFFFF value), or automatically by the SE OS or by the MOS (e.g., if the flag has a 0xF0F0F0F0 value and it is marked for deletion). An invalid value shall be marked as an attack and the RFD flag may be reset to 0. One purpose of having different flag values may be to be able to keep the RFD ability permanently in the factory and not in the field by an end user of device 110, such that it may be the responsibility of the factory flow to enforce the deletion of the flag. In other embodiments, the RFD flag can also be set after verification of an entitlement in the manifest received by the SE OS on device 110 in the field from update device 112.

Figure 7:
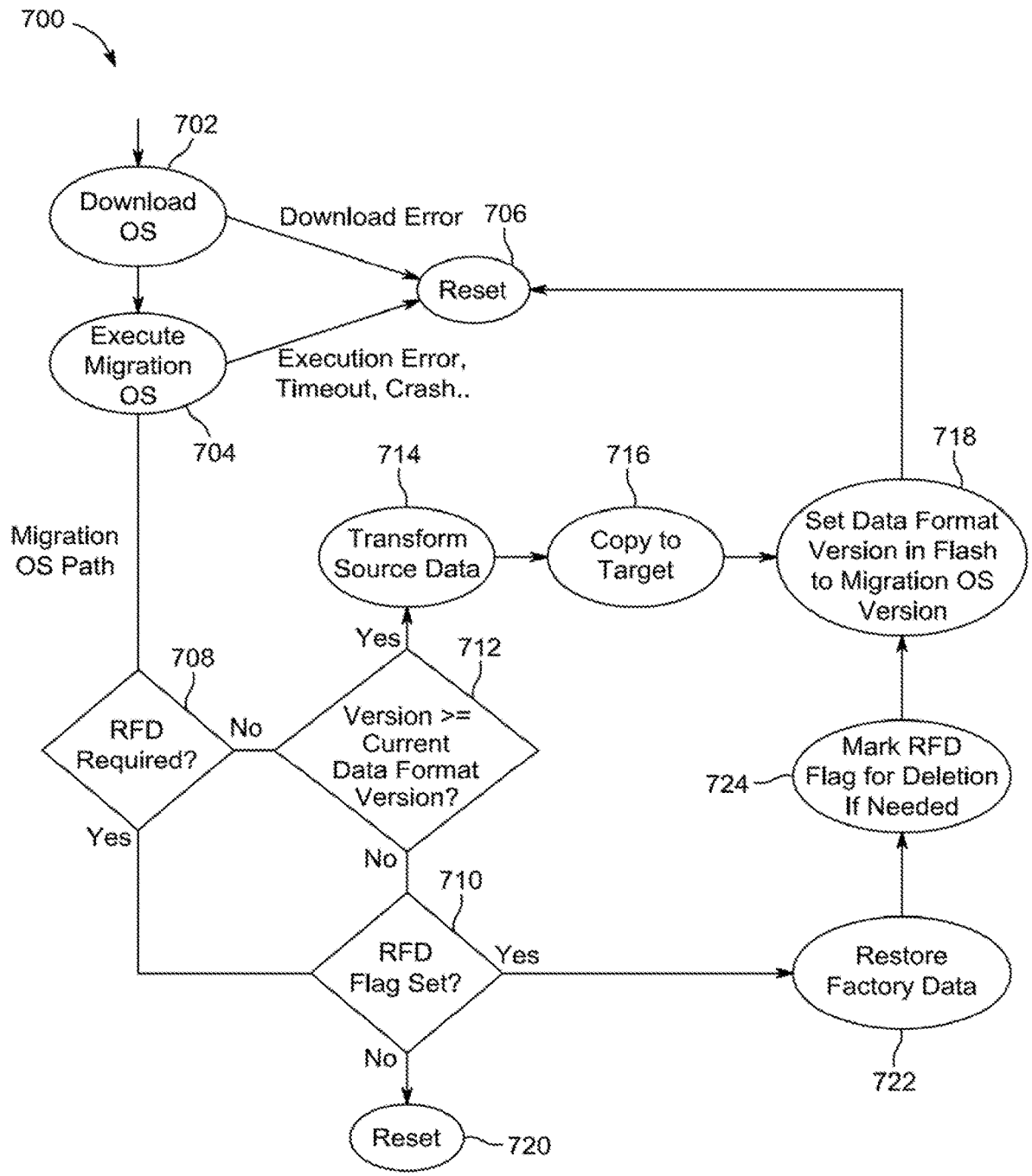
FIG. 7 is a flowchart of another illustrative process for preserving trust data during secure element operating system updates.

As shown by an illustrative process 700 of FIG. 7, any MOS may include (e.g., embed) the RFD capability, and a dedicated FMOS may be reduced to such a capability. As shown, an RFD process 700 may be triggered by a command to the MOS at operation 708 (e.g., after a successful receive update package/download OS operation 702 (e.g., similar to operation 302) and a successful execute MOS operation 704 (e.g., similar to operation 316 or operation 320), either of which may alternatively result in a reset operation 706 if an error, timeout, crash, or the like may occur), where such a command to the MOS may be operative to instruct the MOS whether it must carry out RFD instead of migrating data, which may go along with a configuration that the MOS may be operative to wait for commands to get exactly what is requested before starting any SE OS data migration (e.g., there may be no automatic MOS action if a host has not requested anything of the MOS). In some embodiments, only a FMOS may be configured to be fully autonomous and perform RFD without waiting for a dedicated command. Before attempting to perform RFD, the MOS may be operative to check the RFD entitlement flag value at operation 710, whereby, if the RFD flag is not set to a valid non-zero value, RFD may not be performed and process 700 may perform operations 712, 714, 716, and 718 similarly to operations described above for SE OS data migration. However, if the RFD flag is set to an invalid value, it may be marked as an attack and the flag may be reset to 0 (e.g., at operation 720). However, in case the migration involves a data format version downgrade, RFD may be attempted by the MOS as soon as the RFD flag entitles it, even if the host has not explicitly requested RFD (e.g., at operation 722 and the RFD flag may then be marked for delete at operation 724 if appropriate).

Figure 8:
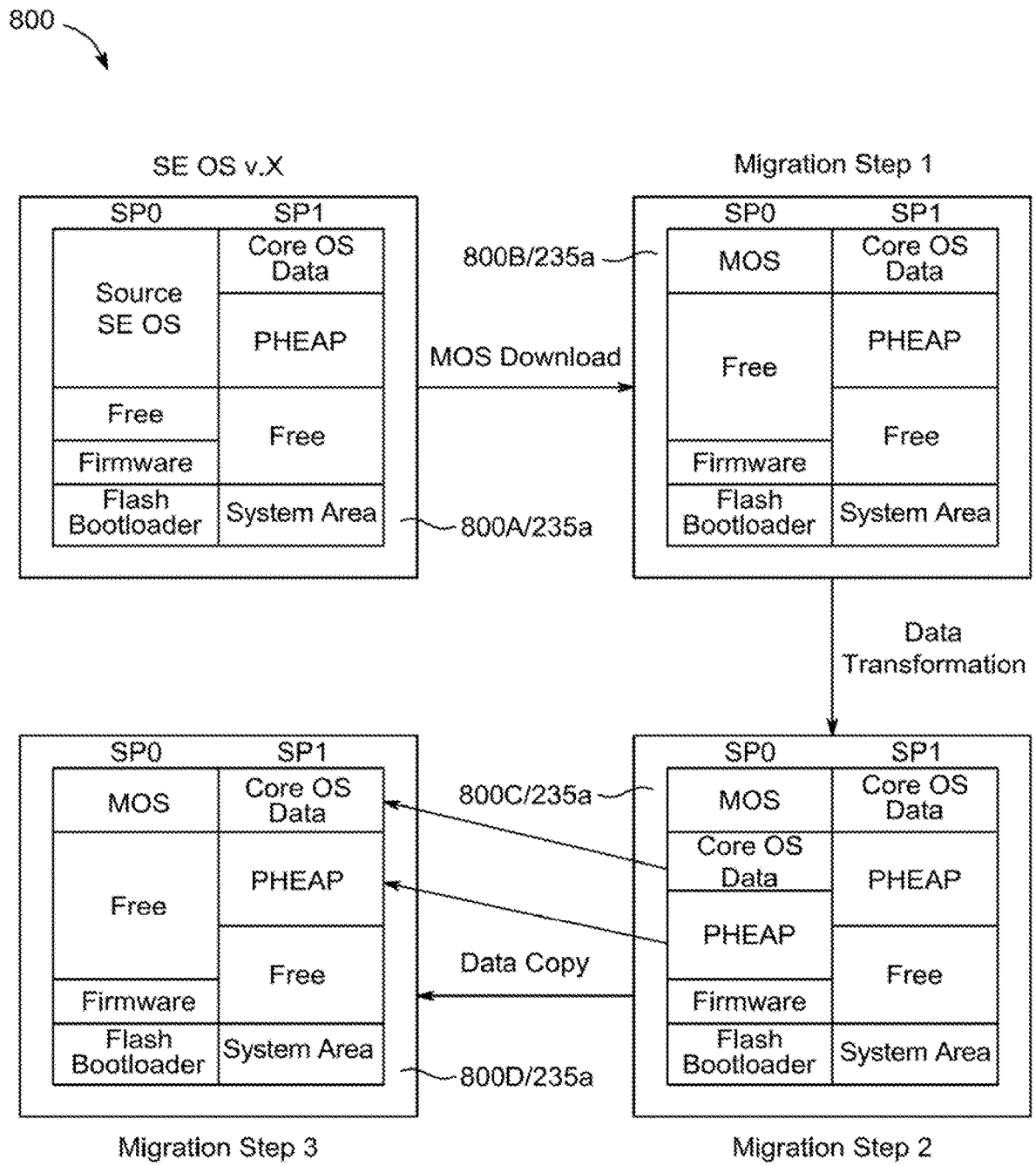
FIG. 8 shows various example configurations of a memory portion of a secure element of the system of FIGS. 1-2A during a secure element operating system update.

As shown with respect to FIG. 8, various configurations 800A-800D of a memory portion 235a of SE memory 235 may be present during different portions of an SE OS update process. For example, memory portion 235a may be any suitable memory portion, such as NVM memory divided into a first part SP0 and a second part SP1 that may be operative to generally contain code and data, respectively. As shown, at configuration 800A, prior to an update, a source SE OS may be stored in SP0 along with any other suitable information (e.g., code, such as firmware and/or a flash bootloader (e.g., at least a portion of updating OS 234)), while SP1 may store any suitable data, such as trusted OS data, including core OS data and PHEAP (e.g., a heap with user OS data). Then, as shown, at configuration 800B, after the source SE OS has been unloaded and an MOS associated with the target SE OS has been loaded, SP0 may include more free space due to the loaded MOS taking up less of the capacity of SP0 than the source SE OS that has been unloaded. Then, as shown at configuration 800C, certain portions of the SP1 data, such as the core OS data and/or the user OS data of PHEAP (e.g., the trusted OS data to be preserved) may be copied and transformed into a portion of the free space of SP0. Then, as shown at configuration 800D, that copied and transformed trusted OS data may be copied back over the untransformed data into SP1. Then, similarly to as shown at configuration 800A, the MOS may be unloaded from SP0 and the target SE OS may be loaded into SP0. Therefore, memory portion 235a may be operative to make use of the smaller size of the MOS compared to the source SE OS to enable appropriate transformation and conversion strategies that may still work well when the SE memory portion 235a may be exhausted in normal operation (e.g., at configuration 800A), such that memory portion 235a may not reserve free space during normal operation. However, it is to be understood that if the free space of SP1 is sufficient to host a copy of the OS data as transformed, then SP0 free space may not need to be used (e.g., at configuration 800C).

Figure 9:
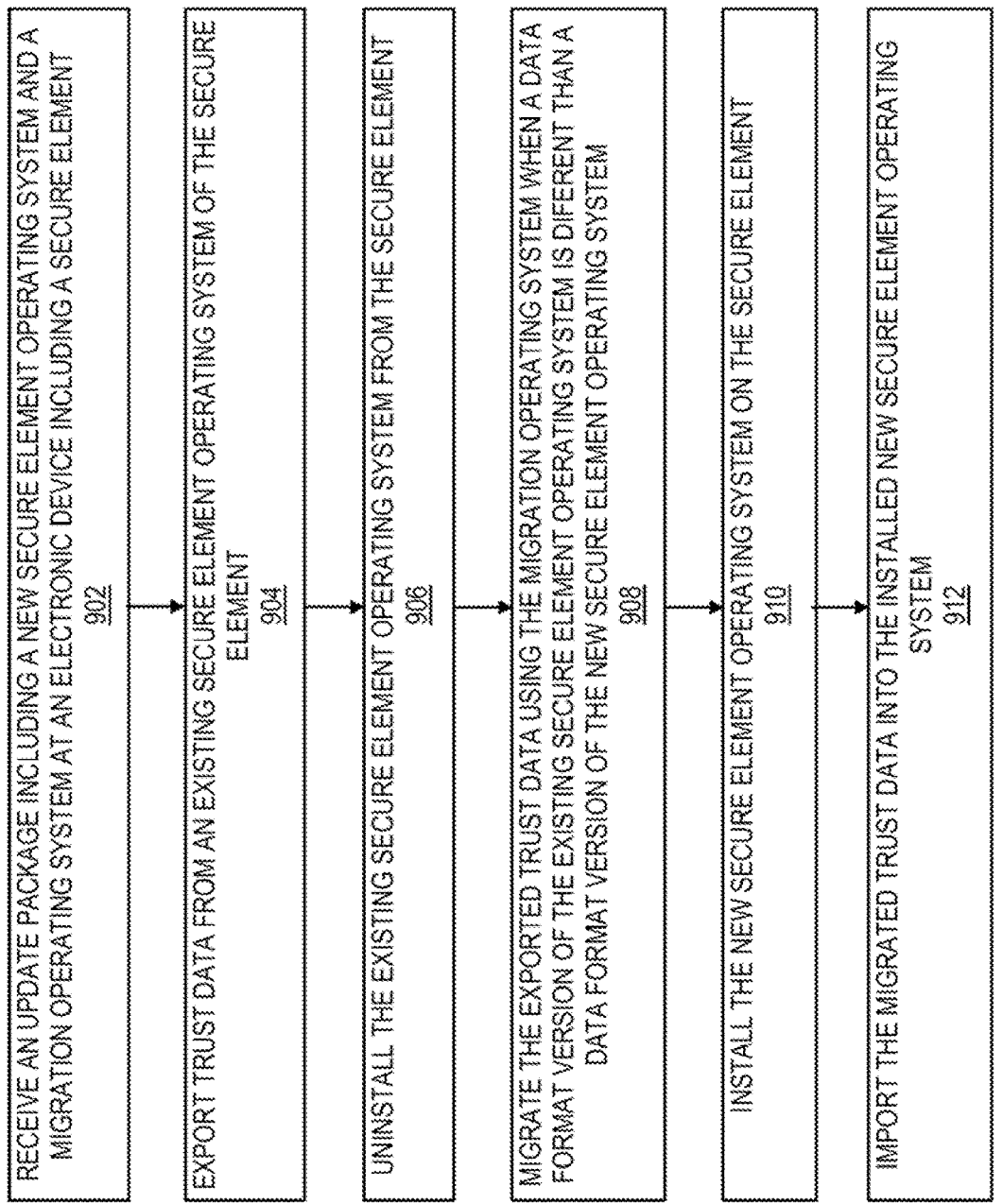
FIG. 9 is a flowchart of yet another illustrative process for preserving trust data during secure element operating system updates.

FIG. 9 is a flowchart of an illustrative process 900 for preserving data during an operating system update on an electronic device including a communications component and a secure element, wherein the secure element includes an existing secure element operating system with trust data. At operation 902 of process 900, an update package including a new secure element operating system and a migration operating system may be received by the communications component (e.g., device 100 may receive such an update package 233). At operation 904 of process 900, the secure element may export the trust data from the existing secure element operating system (e.g., during a preflight migration operation). At operation 906 of process 900, the secure element may uninstall the existing secure element operating system (e.g., during a preflight migration operation). At operation 908 of process 900, the exported trust data may be migrated using the migration operating system when a data format version of the existing secure element operating system is different than a data format version of the new secure element operating system. At operation 910 of process 900, the new secure element operating system may be installed on the secure element. At operation 912 of process 900, the migrated trust data may be imported into the installed new secure element operating system.

It is understood that the operations shown in process 900 of FIG. 9 are only illustrative and that existing operations may be modified or omitted, additional operations may be added, and the order of certain operations may be altered.

Further Description of FIG. 1 and FIG. 2

Other device 112 of FIG. 1 may be any suitable device that may be controlled or otherwise managed by any suitable entity, such as a commercial entity subsystem, such as a manufacturer of electronic device 110, and/or a financial institution subsystem, such as a service provider responsible for one or more payment credentials represented by one or more payment applets 236. Although not shown, device 112 of FIG. 1 may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component (e.g., a factory HSM), and/or a store component. One, some, or all components of device 112 may be implemented using one or more processor components, which may be the same as or similar to one or more components of device 110, such as processing component(s), memory component(s), communication component(s), and the like.

An SMP broker component of device 112 may be configured to manage secure communication authentication with device 110 (e.g., secure element 230 of device 100). An operating system or other application of device 110 may be configured to call specific application programming interfaces ("APIs") and an SMP broker component may be configured to process requests of those APIs and respond with data that may derive the user interface of device 100 and/or respond with application protocol data units ("APDUs") that may communicate with secure element 230 of device 110 (e.g., via a communication path between device 112 and device 110). An SMP TSM component of device 112 may be configured to provide GlobalPlatform-based services that may be used to carry out operations on device 110. GlobalPlatform, or any other suitable secure channel protocol, may enable such an SMP TSM component to properly communicate and/or provision sensitive account data between secure element 230 of device 110 and a TSM for secure data communication.

An SMP TSM component of device 112 may be configured to use an HSM component to protect its keys and generate new keys. An SMP crypto services component of device 112 may be configured to provide key management and cryptography operations that may be required for user authentication and/or confidential data transmission between various components of system 100. Such an SMP crypto services component may utilize an HSM component of device 112 for secure key storage and/or opaque cryptographic operations.

As mentioned, electronic device 110 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 110 may perform a single function (e.g., a device dedicated to conducting financial transactions) and, in other embodiments, electronic device 110 may perform multiple functions (e.g., a device that conducts financial transactions, plays music, and receives and transmits telephone calls). Electronic device 110 may be any portable, mobile, hand-held, or miniature electronic device that may be configured to conduct financial transactions wherever a user travels. Some miniature electronic devices may have a form factor that is smaller than that of hand-held electronic devices, such as an iPhone™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 110 may not be portable at all, but may instead be generally stationary.

Memory subsystem 212 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory subsystem 212 may include cache memory, which may be one or more different types of memory used for temporarily storing data for electronic device applications. Memory subsystem 212 may be fixedly embedded within electronic device 110 or may be incorporated on one or more suitable types of cards that may be repeatedly inserted into and removed from electronic device 110 (e.g., a subscriber identity module ("SIM") card or secure digital ("SD") memory card). Memory subsystem 212 may store media data (e.g., music and image files), software (e.g., for implementing functions on device 110), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Networking subsystem 214 may be provided to allow device 110 to communicate with one or more other electronic devices or servers or subsystems (e.g., one or more devices 112 of system 100) using any suitable communications protocol. For example, networking subsystem 214 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multiband, etc.), any communications protocol that may be used by a low power Wireless Personal Area Network ("6LoW-PAN") module, any other communications protocol, or any combination thereof. Networking subsystem 214 may be configured to determine a geographical position of electronic device 110. For example, networking subsystem 214 may utilize the global positioning system ("GPS") or a regional or site-wide positioning system that may use cell tower positioning technology or Wi-Fi technology.

Electronic device 110 may also include near field communication ("NFC") capabilities, including any suitable proximity-based communication mechanism that may enable contactless proximity-based transactions or communications between electronic device 110 and a merchant POS terminal (e.g., device 112 as a POS merchant terminal), which may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, such NFC capability may allow for close range communication at relatively high data rates (e.g., 370 Mbps), and may comply with any suitable standards, such as the TransferJet™ protocol. Such NFC communication between device 110 and device 112 may occur within any suitable close range distance, such as a range of approximately 2 to 10 centimeters, and may operate at any suitable frequency (e.g., 13.56 MHz). For example, such close range communication of an NFC capability of device 110 may take place via magnetic field induction and/or to retrieve information from tags having radio frequency identification ("RFID") circuitry.

Secure element 230 may be configured to provide a tamper-resistant platform (e.g., as a single or multiple chip secure microcontroller) that may be capable of securely hosting applications and their confidential and cryptographic data in accordance with rules and security requirements that may be set forth by a set of well-identified trusted authorities (e.g., an authority of financial institution subsystem and/or an industry standard, such as GlobalPlatform). Secure element 230 may be a highly secure, tamper-resistant hardware component within a chip, which may be used for storing sensitive data or applications on electronic device 110. At least a portion of secure element 230 may be provided in a removable circuit card, such as a universal integrated circuit card ("UICC") or a subscriber identity module ("SIM") card, that may be used in electronic devices 110 compatible within global system for mobile communications ("GSM") networks, universal mobile telecommunications systems ("UMTS") and/or long-term evolution ("LTE") standard networks. Alternatively or additionally, at least a portion of secure element 230 may be provided in an integrated circuit that may be embedded into electronic device 110 during manufacturing of device 110. Alternatively or additionally, at least a portion of secure element 230 may be provided in a peripheral device that can be plugged into, inserted into, or otherwise coupled to electronic device 110, such as a micro secure digital ("SD") memory card.

As mentioned, secure element 230 may include one or more of an issuer security domain ("ISD") 237 and a supplemental security domain ("SSD") 238 (e.g., a service provider security domain ("SPSD"), a trusted service manager security domain ("TSMSD"), etc.), which may be defined and managed by an NFC specification standard (e.g., GlobalPlatform). For example, ISD 237 may be a portion of secure element 230 in which a trusted service manager ("TSM") or issuing financial institution may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 110, for credential content management, and/or for security domain management. A specific supplemental security domain ("SSD") may be associated with a particular TSM and at least one specific commerce credential (e.g., a specific credit card credential or a specific public transit card credential) that may provide specific privileges or payment rights to electronic device 110.

While device 110 has been described with respect to near field communication, it is to be understood that device 110 may be configured to provide any suitable contactless proximity-based mobile payment or any other suitable type of a contactless proximity-based communication between electronic device 110 and remote device 112 as a merchant. For example, device 110 may be configured to provide any suitable short-range communication, such as those involving electromagnetic/electrostatic coupling technologies.

Moreover, one, some, or all of the processes described with respect to FIGS. 1-9 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 110 via networking subsystem 214. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystems of system 100 may be provided as a software construct, firmware construct, one or more hardware components, or a combination thereof. For example, any, each, or at least one module or component or subsystem of system 100 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 100 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 100 may be stored in or otherwise accessible to an entity of system 100 in any suitable manner. For example, any or each module of secure subsystem 218 may be implemented using any suitable technologies (e.g., as one or more integrated circuit devices), and different modules may or may not be identical in structure, capabilities, and operation. Any or all of the modules or other components of system 100 may be mounted on an expansion card, mounted directly on a system motherboard, or integrated into a system chipset component (e.g., into a "north bridge" chip).

Any or each module or component of system 100 (e.g., any or each module of secure subsystem 218) may be a dedicated system implemented using one or more expansion cards adapted for various bus standards. For example, all of the modules may be mounted on different interconnected expansion cards or all of the modules may be mounted on one expansion card. With respect to secure subsystem 218, by way of example only, the components or modules of secure subsystem 218 may interface with a motherboard of device 110 through an expansion slot (e.g., a peripheral component interconnect ("PCI") slot or a PCI express slot). Alternatively, secure subsystem 218 need not be removable but may include one or more dedicated modules that may include memory (e.g., RAM) dedicated to the utilization of the module. In other embodiments, secure subsystem 218 may be integrated into device 110. For example, a module of secure subsystem 218 may utilize a portion of device memory. Any or each module or component of system 100 (e.g., any or each module of secure subsystem 218) may include its own processing circuitry and/or memory. Alternatively, any or each module or component of system 100 (e.g., any or each module of secure subsystem 218) may share processing circuitry and/or memory with any other module of secure subsystem 218 and/or processing subsystem 210 and/or memory subsystem 212 of device 110.

While there have been described systems, methods, and computer-readable media for preserving trust data during operating system updates of a secure element of an electronic device, it is to be understood that many changes may be made therein without departing from the spirit and scope of the subject matter described herein in any way. For example, in the preceding description, there may be reference to "some embodiments," however, it is to be noted that "some embodiments" may describe a subset of all of the possible embodiments, but does not always specify the same subset of embodiments. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for preserving data during an operating system update on an electronic device comprising a communications component and a secure element, wherein the secure element comprises an existing secure element operating system ("ESEOS") with trust data, the method comprising:
    receiving, with the communications component, an update package comprising a new secure element operating system ("NSEOS") and a migration operating system ("MOS");
    processing, with the secure element, the received update package to update the ESEOS to the NSEOS by:
        exporting the trust data from the ESEOS;
        after the exporting, uninstalling the ESEOS;
        migrating the exported trust data using the MOS when a data format version of the ESEOS is different than a data format version of the NSEOS;
        installing the NSEOS; and
        importing the migrated trust data into the installed NSEOS.

2. The method of claim 1, wherein the trust data comprises core data that is essential for the viability of any operating system of the secure element.

3. The method of claim 2, wherein the trust data further comprises user data that is specific to a user of the secure element.

4. The method of claim 1, wherein the trust data comprises user data that is specific to a user of the secure element.

5. The method of claim 1, wherein the trust data comprises at least one type of data of the following types of data:
    data that facilitates pairing the secure element to a secure enclave processor of the electronic device;
    data that facilitates secure provisioning of an applet onto the secure element;
    data that facilitates secure signing of information on the secure element; and
    data that is necessary to restore an initial factory setting of the secure element.

6. The method of claim 1, wherein the migrating comprises:
    analyzing the data format version of the ESEOS based on the data format version of the NSEOS;
    determining, with the MOS, whether a data content migration operation is necessary based on the analyzing; and
    carrying out the data content migration operation when the data content migration operation is determined to be necessary.

7. The method of claim 1, wherein the migrating comprises data content migration.

8. The method of claim 7, wherein the data content migration comprises one of:
    adding a field to the trust data;
    removing a field from the trust data; and
    modifying a field of the trust data.

9. The method of claim 7, wherein the migrating further comprises data structure migration.

10. The method of claim 1, wherein the migrating comprises:
    analyzing the data format version of the ESEOS based on the data format version of the NSEOS;
    determining, with the MOS, whether a data structure migration operation is necessary based on the analyzing; and
    carrying out the data structure migration operation when the data structure migration operation is determined to be necessary.

11. The method of claim 1, wherein the migrating comprises data structure migration.

12. The method of claim 11, wherein the data structure migration comprises one of:
- changing an internal representation of a memory element of the secure element;
- modifying memory area size of the secure element;
- adding core data to the trust data; and
- removing core data from the trust data.

13. The method of claim 1, wherein:
the exported trust data is stored in a first memory portion of memory of the secure element; and
the migrating comprises:
- loading the MOS into a second memory portion of the memory of the secure element;
- transforming an object of the exported trust data into an object of the migrated trust data using the loaded MOS while maintaining the object of the exported trust data in the first memory portion;
- storing the object of the migrated trust data into a third memory portion of the memory of the secure element; and
- after the storing, deleting the object of the exported trust data from the first memory portion.

14. The method of claim 13, wherein the uninstalling the ESEOS comprises uninstalling at least a portion of the ESEOS from at least a portion of the second memory portion.

15. The method of claim 13, wherein the migrating further comprises, after the deleting, moving at least a portion of the stored object of the migrated trust data into at least a portion of the first memory portion.

16. The method of claim 13, wherein the installing the NSEOS comprises installing at least a portion of the NSEOS into at least a portion of the second memory portion.

17. The method of claim 13, further comprising, prior to the importing, unloading the MOS from the second memory portion.

18. The method of claim 1, wherein, when the data format version of the ESEOS is the same as the data format version of the NSEOS, the method further comprises importing the exported trust data into the installed NSEOS.

19. An electronic device comprising:
a communications circuit configured to receive an update package comprising a new secure element operating system and a migration operating system; and
a secure element configured to: store an existing secure element operating system and existing trust data that is associated with the existing secure element operating system, and update the existing secure element operating system to the new secure element operating system of the update package by:
- exporting the existing trust data from the existing secure element operating system;
- after the exporting, uninstalling the existing secure element operating system;
- migrating the exported existing trust data into new trust data using at least one data transformation rule of the migration operating system when a first data format of the existing secure element operating system differs from a second data format of the new operating system;
- installing the new secure element operating system; and
- importing the new trust data into the installed new operating system.

20. A product comprising:
a non-transitory computer-readable medium; and
computer-readable instructions, stored on the computer-readable medium, that, when executed, are effective to cause a computer to:
- receive, by an electronic device, an update package comprising a new secure element operating system and a migration operating system;
- process, with a secure element of the electronic device, the received update package to update an existing secure element operating system of the secure element to the new secure element operating system by:
  - exporting trust data from the existing secure element operating system;
  - after the exporting, uninstalling the existing secure element operating system;
  - migrating the exported trust data using the migration operating system when a first data format of the existing secure element operating system differs from a second data format of the new secure element operating system;
  - installing the new secure element operating system; and
  - importing the migrated trust data into the installed new secure element operating system.

* * * * *

UNITED STATES PATENT AND TRADEMARK OFFICE
CERTIFICATE OF CORRECTION

PATENT NO. : 10,936,719 B2
APPLICATION NO. : 15/712097
DATED : March 2, 2021
INVENTOR(S) : Hervé Sibert et al.

Page 1 of 1

It is certified that error appears in the above-identified patent and that said Letters Patent is hereby corrected as shown below:

On the Title Page

Item (57) ABSTRACT, Line 3: Replace "provide" with --provided--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*